United States Patent
Onozawa

[11] Patent Number: 5,837,992
[45] Date of Patent: Nov. 17, 1998

[54] MEMORY CARD AND ITS MANUFACTURING METHOD

[75] Inventor: Tetsuya Onozawa, Kanagawa, Japan

[73] Assignee: Shinko Nameplate Co., Ltd., Kanagawa, Japan

[21] Appl. No.: 521,824

[22] Filed: Aug. 31, 1995

Related U.S. Application Data

[63] Continuation-in-part of Ser. No. 353,518, Dec. 9, 1994, abandoned.

[30] Foreign Application Priority Data

Jul. 15, 1994 [JP] Japan .................................. 6-186349
Aug. 30, 1994 [JP] Japan .................................. 6-228724

[51] Int. Cl.⁶ .................................................. G06K 19/00
[52] U.S. Cl. ........................ 235/488; 235/382; 235/492
[58] Field of Search .................................. 235/492, 491, 235/488, 489, 382, 487

[56] References Cited

U.S. PATENT DOCUMENTS

| | | | |
|---|---|---|---|
| 4,737,620 | 4/1988 | Mollett et al. | 235/492 |
| 5,013,900 | 5/1991 | Hoppe | 235/492 |
| 5,173,840 | 12/1992 | Kodai et al. | 235/492 X |
| 5,327,010 | 7/1994 | Uenaka et al. | 235/492 X |
| 5,399,847 | 3/1995 | Droz | 235/488 |

*Primary Examiner*—Donald T. Hajec
*Assistant Examiner*—Karl Frech
*Attorney, Agent, or Firm*—Lackenbach Siegel Marzullo Aronson & Greenspan, P.C.

[57] ABSTRACT

In a memory card having circuit elements such as a semiconductor device and transmitting/receiving device mounted on a synthetic resin substrate shaped like a flat plate, the circuit elements are disposed and sealed in the synthetic resin substrate, and both surfaces of the substrate are covered with synthetic resin sheet members. This achieves a memory card, which is resistant to bending and also survives harsh operating environment. Also provided are a memory card, which can be easily developed into a multi-function card such as an ID card at low cost, and its manufacturing method.

11 Claims, 34 Drawing Sheets

FIG.13
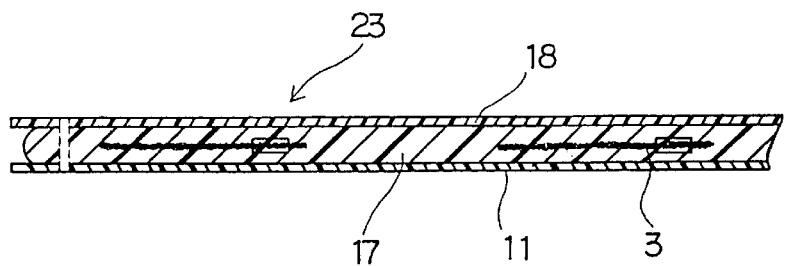
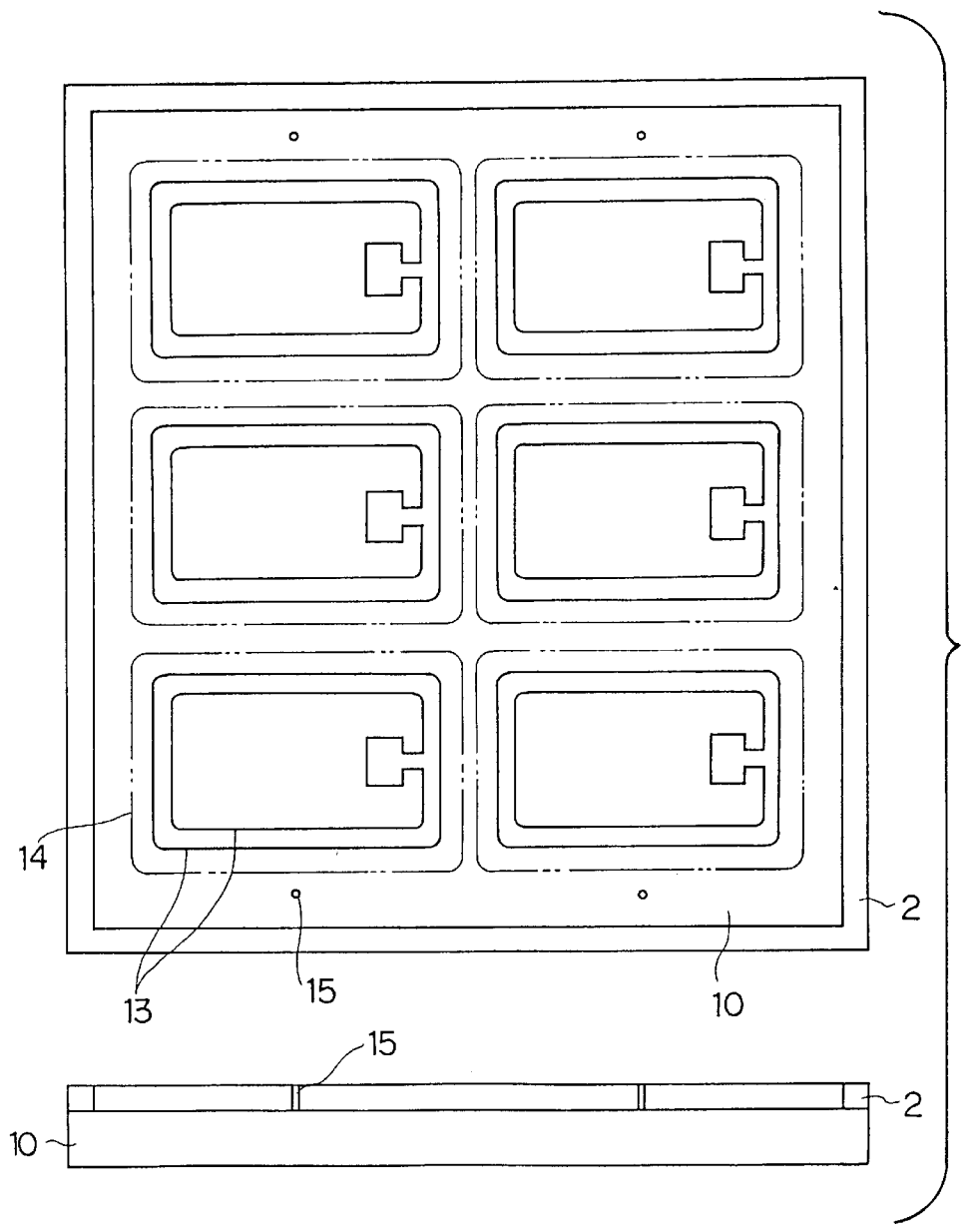
FIG.14 front side back side
(a part)

cross section A-A cross section A-A detailed view of B

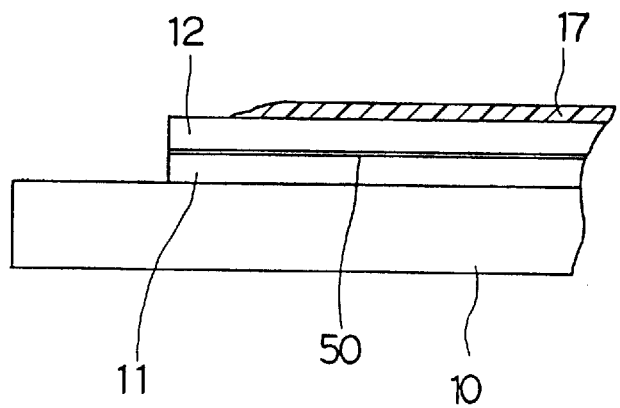
FIG.45
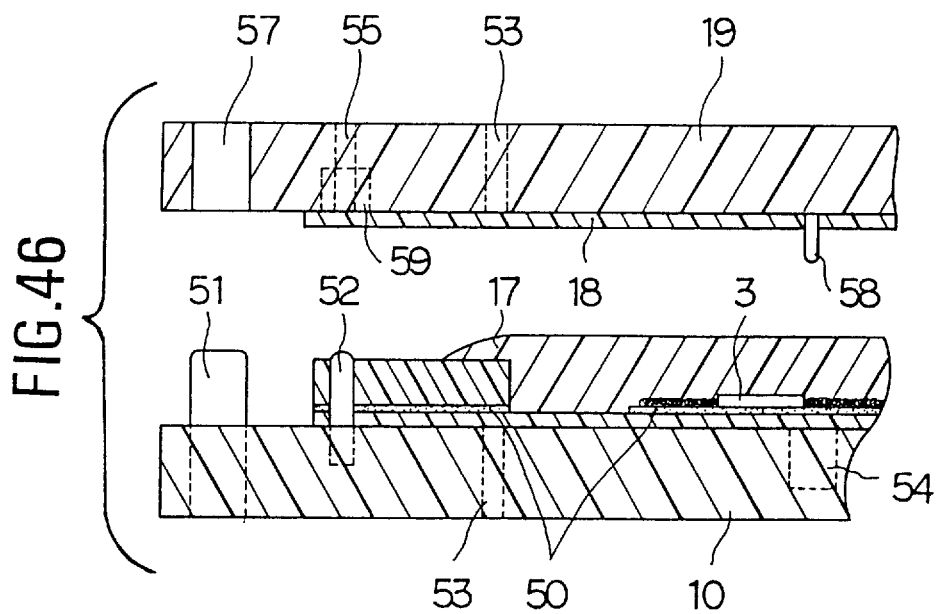

PRIOR ART cross section A-A

MEMORY CARD AND ITS MANUFACTURING METHOD

CROSS-REFERENCE TO RELATED APPLICATION

This application is a continuation-in-part of U.S. patent application Ser. No. 08/353,518 filed on Dec. 9, 1994, now abandoned.

BACKGROUND OF THE INVENTION

1. Field of the Invention

The present invention relates to a memory card such as an IC card and non-contact type card and, more particularly, to a memory card, which is resistant to bending and which survives harsh operating environment, and its manufacturing method. The present invention further relates to a memory card, which can easily be developed to multifunction cards such as ID cards at low cost, and its manufacturing method.

2. Description of the Related Art

Generally, memory cards are roughly divided into a two-piece type, cartridge type, and other type typically represented by IC cards. This invention is connected particularly to IC cards used as ID cards, non-contact type cards, radio cards, optical cards, and other memory cards.

Among these memory cards, the IC cards, for example, are used at diverse financial institutions, distribution facilities, companies, medical institutions, etc. The IC cards have larger memory capacities than magnetic cards. Taking advantage of their larger memory capacities, IC cards have recently become available, which combine the functions of cash cards and the functions for recording personal information.

The non-contact type cards are more resistant to harsh operating environment than the contact type cards; therefore, they are used primarily for factory automation (FA) including work management and railway or vehicle operation management.

The radio cards are used for security systems for controlling persons entering and leaving rooms or for other similar purposes by utilizing microwaves or optical communication. The radio cards are under further development so that they may be applied for ID cards to replace the present commuters' tickets, for making fare adjustment at parking lots or expressways, and for theme parks and other recreational facilities.

Owing to their large memory capacities (30,000 times as large as those of magnetic cards or 350 times as large as those of IC cards), the optical cards are used for storing medical data and the like. The optical cards are expected to see expanded demand also in an electronic publishing field and other fields in the future.

As shown in FIG. 63 and FIG. 64, such a memory card 1 is generally produced by forming a concavity in a base (made of PVC or the like), which is the same as that used for a conventional magnetic stripe card, by NC-engraving or the like and mounting an IC chip 30 or the like on the concavity. In this case, if the card is a radio card, then a planar antenna and circuit elements are mounted in addition to the IC chip to complete the card.

In such a conventional memory card, however, the IC chip and other components are exposed on one surface, posing the following problems. First, the chip exposed on the surface restricts operating environment and operating conditions, thus limiting outdoor use or the use at working fields. This has been one of the big obstacles, which prevent the conventional memory card from being used as an ID card.

Secondly, with the structure described above, there is a danger of disconnection or elements coming off if a card is bent. Furthermore, with such a structure, the card is apt to deform because of the thickness of the entire card or unbalanced weight.

The problems mentioned above would become even more serious as the number of chips increases and as the number of connected wires accordingly increases if a memory card is to be developed into a multifunction card such as the ID card. Hence, it was in fact difficult to use the conventional memory card directly as the ID card or other similar card.

To solve the problems described above, there has been an attempt to completely seal the IC chips or other components in a synthetic resin (hereinafter referred to simply as "resin") to produce the card. This method, however, still presents problems such as variations in the thickness of cards or bubbles remaining in cards. For this reason, this idea has not proceeded beyond the stage of making prototypes.

SUMMARY OF THE INVENTION

Accordingly, it is an object of the present invention to provide a memory card, which solves the aforesaid problems, which is resistant to bending, which survives harsh operating environment, and which can be easily developed into a multifunction card such as an ID card at low cost, and its manufacturing method.

To solve the aforementioned problems, according to the present invention, in a memory card having circuit elements, including semiconductor devices and transmitting/receiving devices, mounted on a resinous substrate shaped like a flat plate, the circuit elements are disposed in a sealed state in the synthetic resin in substrate, and both surfaces of the substrate are covered with resinous sheet members.

In this case, according to the present invention, resins of epoxy type and UV hardened type are mainly used as a synthetic resin for sealing said circuit elements in said substrate, and further, polyester films, vinyl chloride sheets and polycarbonate films are mainly used as synthetic resin sheet members for covering both surfaces of said substrate.

Further according to the present invention, the thickness of said synthetic resin sheet member is about 0.1 mm, and the whole thickness after both surfaces of said substrate having been covered with said synthetic resin sheet members is about 0.76 mm.

Furthermore according to the present invention, a spacer is disposed in said substrate and said spacer is sealed inside said substrate together with said circuit elements. Here, the spacer can be disposed in the periphery of the substrate or in the center of the substrate, or both in the periphery of and the center of the substrate.

In addition, a resinous frame is provided around the substrate with the circuit elements sealed within the frame.

Moreover, said spacer, the material used thereof being mainly such synthetic resins as polycarbonate or polyester, has glue-printed sections on both sides for fixing on said synthetic resin sheet members.

According to the memory card in accordance with the present invention, the circuit elements sealed in the card substrate are advantageous in that disconnection can be prevented when the card is bent and restrictions on operating conditions are minimized because no chip is exposed.

There is another advantage in that the use of a thinner chip allows a thinner card to be produced.

Further, the card provided with resinous sheets on both surfaces of the substrate presents a particularly remarkable advantage that the circuit elements are not exposed on the surface so that the operating environment of the card is not restricted. Then those sheets on both surfaces exhibit similar mechanical strength, elastic modules and degree of shrinkage on both surfaces, thus providing an advantage in that changes caused by changes in temperature and/or humidity can be minimized. Furthermore, marking can be separately printed on the sheets, thereby facilitating the marking on the card. This leads to another advantage in that the design flexibility of the card will be significantly improved.

In this case, according to the present invention, the use of spacers presents an advantage in higher strength, and also the elasticity of them is advantageous in better form retention.

On the other hand, according to the present invention, there are another advantages in saving the material cost of spacers and in the possibility of smaller size, and also in saving the material cost of resinous sealants, and in making higher rigidity and elasticity of the whole memory card and the improved flatness of surfaces of the card possible.

Moreover according to the present invention, the use of resinous frames presents an advantage in higher strength, and also the elasticity of them is advantageous in better form retention.

In addition, according to the present invention, the glue-printed sections facilitate the positioning and the fixing of circuit elements and in-card spacers in the step for mounting circuit elements and other steps, thus leading to an advantage that the manufacturing time and cost are saved, and further, it is also possible to prepare specially parts which have glue-printed sections in advance, hence resulting in another advantage of the good work efficiency.

Furthermore, according to the present invention, putting a spacer between sheet members is advantageous not only in assuring even thickness of the card, but in enabling easy and accurate production of the card within which a spacer is put and which has high rigidity and elasticity. In this case, according to the present invention, there is an advantage that said memory card can be easily and accurately produced:

In addition, according to the present invention, the memory card is produced by using sheet members provided with glue-printed sections, which leads to an advantage that circuit elements and others can be easily fixed, like the above-mentioned case.

According to the present invention, the manufacturing method for the memory card, which has circuit elements such as semiconductor devices and transmitting/receiving devices mounted on a resinous substrate shaped like a flat plate, includes a step (a) for laying a resinous sheet member on a flat lower casting plate, a step (b) for mounting a spacer, which has a slightly thinner thickness than that of the final finish dimension of the memory card, on the lower casting plate, a step (c) for injecting resin onto the lower casting plate, a step (d) for mounting circuit elements on the resin and embedding the circuit elements into the resin, a step (e) for laying a resinous sheet member on the top surface of the resin, a step (f) for placing a flat upper casting plate on the resin and the spacer and pressing the upper casting plate from above, a step (g) for curing the resin while maintaining the pressing pressure, a step (h) for taking a cured resin body out of the casting plates after the resin is cured, and a step (i) for blanking the resin body to a predetermined dimension to form it into a finished memory card.

Further, the manufacturing method according to the present invention includes a step (a) for laying a synthetic resin sheet member on a flat lower casting plate, a step (b) for mounting a spacer on said sheet member and mounting circuit elements on said sheet member, a step (c) for injecting a synthetic resin onto said lower casting plate and embedding said circuit elements in said synthetic resin, a step (d) for placing a flat upper casting plate, which is provided with a synthetic resin sheet member on a surface on the side of said lower casting plate, on the injected synthetic resin and said spacer and pressing said upper casting plate from above, a step (e) for curing the synthetic resin while maintaining said pressing pressure, a step (f) taking out a resin body, which has been cured, from said casting plates, and a step (g) for blanking said resin body to a predetermined dimension to form it into a completed memory card.

Here, according to the present invention, in the step for mounting a spacer on a sheet member, a first spacer, which is placed extending to the outside of the final finish dimensions of the memory card, and a second spacer, which is placed inside the final finish dimensions of the memory card, are mounted on said sheet member. Further according to another aspect of the present invention, in said step thereof for mounting a spacer on a sheet member, a spacer, which is placed extending from the inside to the outside of the final finish dimensions of the memory card, is mounted on said sheet member.

Moreover, according to still another aspect of the present invention, in said step thereof for mounting a spacer on a sheet member, a first spacer, which is placed extending from the inside to the outside of the final finish dimensions of the memory card, and a second spacer, which is placed inside the final finish dimensions of the memory card, are mounted on said sheet member.

On the other hand, according to the present invention, the synthetic resin sheet member has glue-printed sections for fixing at least the circuit elements or the spacer; and further according to the present invention, said spacer has glue-printed sections for fixing said spacer to said synthetic resin sheet member.

In addition, according to the present invention, both surfaces of said final product are ground to be flat. As a result of this method, surfaces of the final product become smooth and polished, thus enabling the clear printing of characters, photographs, etc. on surfaces of the product.

The memory card manufacturing method according to the present invention provides such an effect that the card described above can be efficiently mass-produced with resultant dramatically reduced cost. There is another effect that the use of the spacer assures even and accurate thickness of the card, and pressing by the casting plate improves the flatness of the card. Moreover, when the frame is used, the spacer can be omitted.

BRIEF DESCRIPTION OF DRAWINGS

FIG. 13 is a diagram showing an intermediate product of the first embodiment of the manufacturing method for the memory card according to the present invention;

FIG. 14 is a diagram showing a step for mounting a spacer in a second embodiment of the manufacturing method for the memory card according to the present invention;

FIG. 45 is a diagram showing a step for injecting a resinous sealant of the fifth embodiment of the manufacturing method for the memory card according to the present invention;

FIG. 46 is a diagram showing a step for mounting the upper casting plate onto the lower casting plate in the fifth embodiment of the manufacturing method for the memory card according to the present invention;

DESCRIPTION OF THE PREFERRED EMBODIMENTS

The following describes the embodiments of the present invention with reference to the attached drawings.

Figure 1:
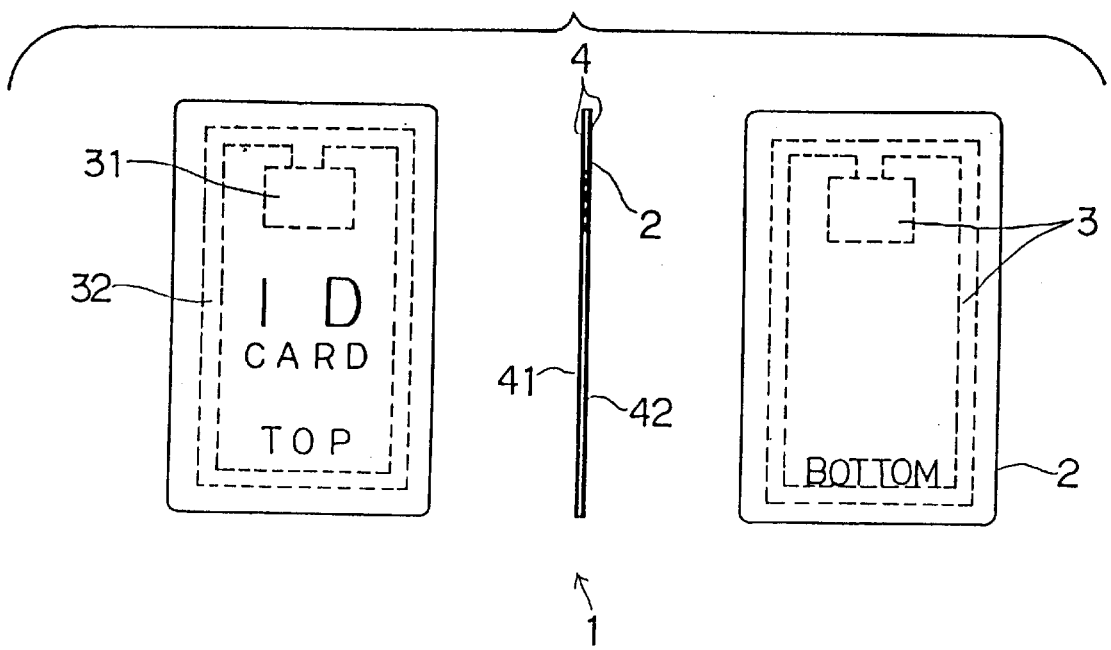
FIG. 1 is a diagram showing the structure of a first embodiment of the memory card according to the present invention.

FIG. 1 shows the configuration of the first embodiment of the memory card according to the present invention. It is assumed that a memory card 1 is used as a so-called ID card. The memory card is comprised of a substrate 2, circuit elements 3, and a sheet 4.

The substrate 2 is made of a resin of polyurethane type, polyester type, urethane type, non-rigid PVC type, silicone type, elastomer type, rubber type, acrylic type, epoxy type, fluorine type, UV hardened resin type, engineering plastics type such as PPS and POM, or Vitroflex (trade name) manufactured by Vitro (Sumitomo 3M). The material may be transparent, colored or colorless.

The circuit elements 3 are sealed in the substrate 2, being enclosed in the resin; they are roughly divided into a semiconductor device 31 and receiving/transmitting device 32. Used as the semiconductor device 31 are a monolithic IC, hybrid IC, transistor, diode, various types of sensors, resistor, capacitor, semiconductor laser, liquid crystal, LED, flexible plate with circuit element, etc. Used as the receiving/transmitting device 32 are a coiled antenna, planar antenna, optical sensor, infrared sensor, heat sensor, vibrator, etc. Through the circuit elements 3, predetermined personal information is transferred to and from corresponding associated equipment, thus fulfilling the functions of the ID card.

The resinous sheet 4 covers the surfaces of the memory card 1. The sheet 4 consists of an upper sheet 41, which covers the front surface of the memory card 1, and a lower sheet 42, which covers the back surface. The thickness of the sheet 4 is appropriately fixed according to the specifications of each type of product; it ranges from 0.01 to 0.3 mm. As the material for the sheet, polyester film, synthetic paper, vinyl chloride sheet, polycarbonate film or the like is used. A combination of the sheet and the substrate 2, which exhibits high mutual adhesion, is selected. For instance, a PET sheet is used in combination with the aforesaid Vitroflex (trade name). In this case also, it is determined whether they should be colored, transparent or colorless according to the specifications of each type of product.

The front surface of the sheet carries characters based on the specifications of each card, the characters being marked by screen printing, offset printing, seal printing, hot stamping, etc.

Figure 2:
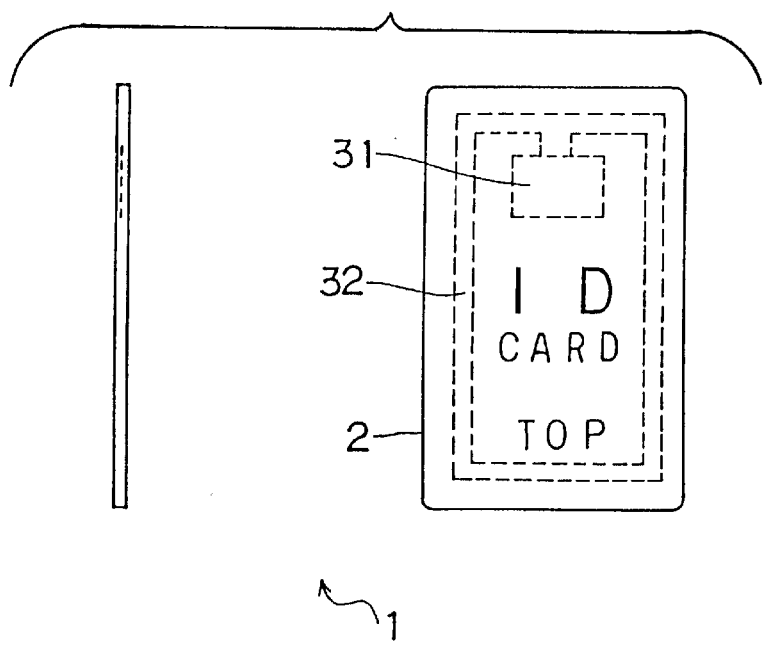
FIG. 2 is a diagram showing the structure of a second embodiment of the memory card according to the present invention.
Figure 3:
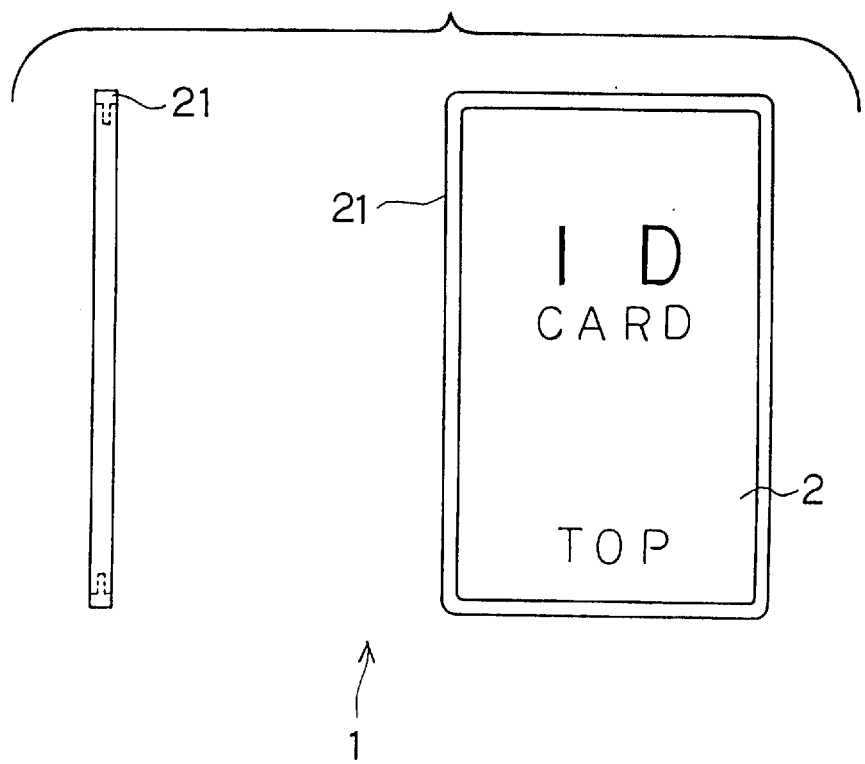
FIG. 3 is a diagram showing the structure of a third embodiment of the memory card according to the present invention.

FIG. 2 shows the configuration of the second embodiment of the memory card according to the present invention, while FIG. 3 shows the configuration of the third embodiment. The embodiment given in FIG. 2 shares the same configuration as that of the first embodiment 1 except that it has no sheet 4. The circuit elements 3 are sealed in the substrate 2 so that they are not exposed on the surfaces of the substrate 2. The characters and the like are directly printed on the front surface of the substrate 2. This configuration makes it possible to produce memory cards more easily at lower cost than the memory card of the first embodiment.

The embodiment shown in FIG. 3 uses a frame 21 to form the substrate 2 of the first embodiment. The frame 21 is made of polycarbonate, ABS, PPS, POM or the like are formed by injection molding. The use of the frame 21 provides higher mechanical strength against bending or twisting than the card of the first embodiment. In this third embodiment also, a configuration without the sheet 4 may be employed; in this case, the cards can, of course, be produced more easily at lower cost than the card shown in FIG. 3.

The manufacturing method for the memory card according to the present invention will now be described.

Figure 4:
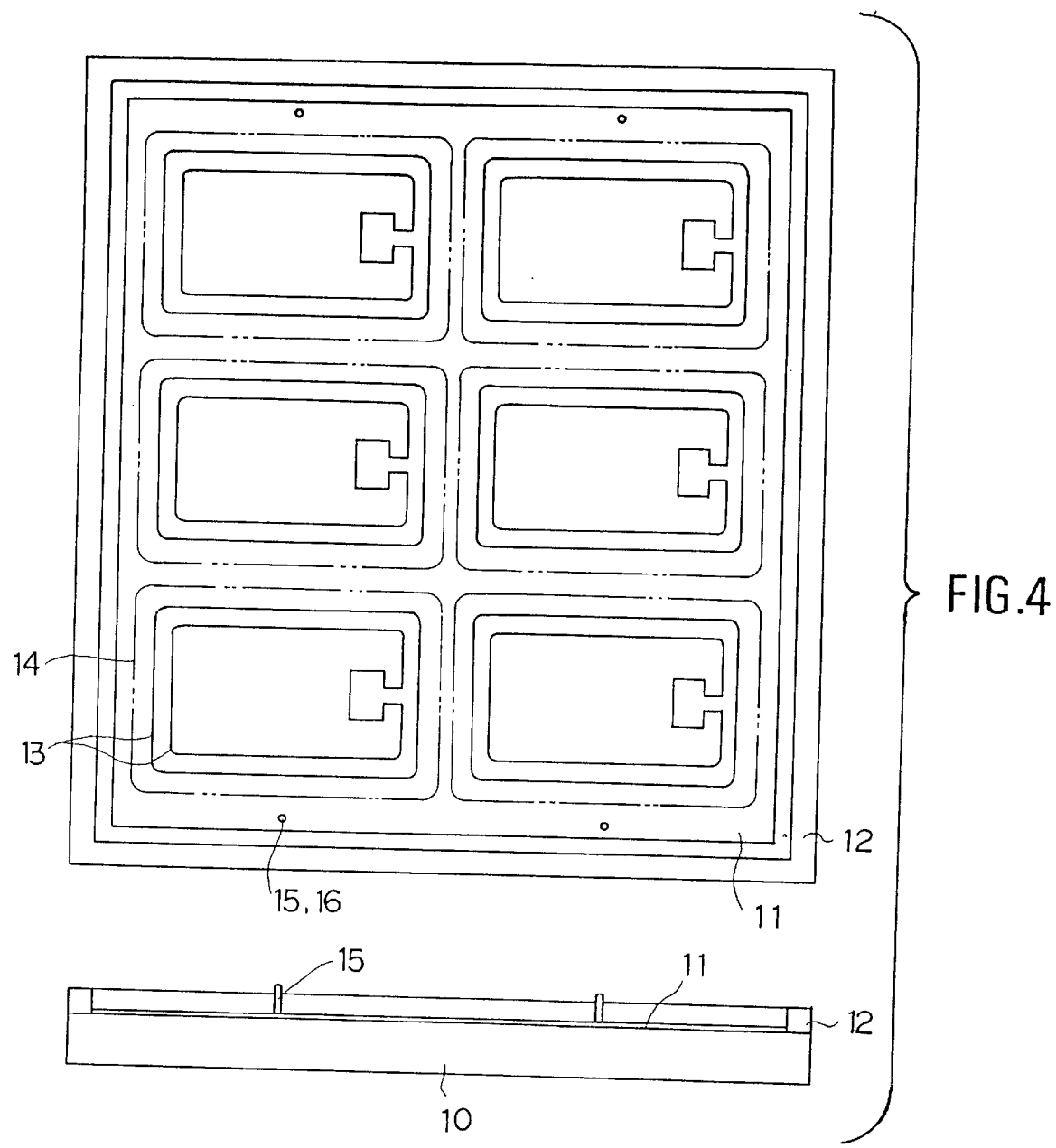
FIG. 4 is a diagram showing a step for mounting a spacer and a lower sheet of a first embodiment of the manufacturing method for the memory card according to the present invention.
Figure 5:
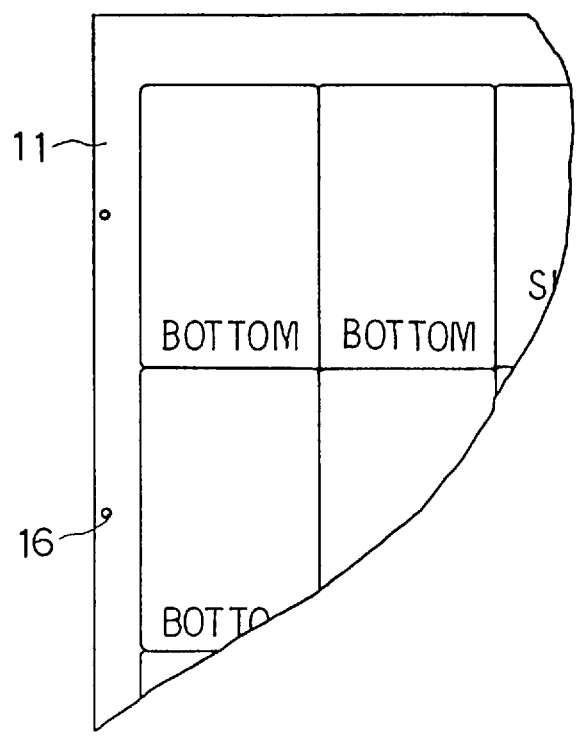
FIG. 5 is a diagram showing the lower sheet member observed from the rear, the lower sheet member being used in the first embodiment of the manufacturing method for the memory card according to the present invention.

FIG. 4 through FIG. 13 illustrate the steps and the configuration of a mold of the first embodiment of the manufacturing method. In a first step, a mold release agent is applied to the surface of a lower casting plate 10, then a lower sheet member 11, which composes the aforesaid sheet 42, and a spacer 12 are placed thereon (FIG. 4). The lower casting plate 10 is made of a glass plate or a transparent resinous plate of an acrylic material or the like, which is 10 to 20 mm thick. An upper surface thereof is provided with a guiding post 15 for positioning the lower sheet member 11. The lower sheet member 11 is made of a polyester film or the like as described in connection with the lower sheet 42. Printed on the inside surface of the product are mounting position marking lines 13, which show the positions where circuit elements are to be installed, and a dimension marking line 14, which shows the final product dimension, as shown in FIG. 4. Printed on the rear surface, that is, the outside surface of the product, is a marking based on the specifications of a card as shown in FIG. 5. Further, the lower sheet member 11 is provided with a positioning guide hole 16, which fits with the guiding post 15 of the lower casting plate 10.

Provided on the lower casting plate 10 is a frame-like spacer 12, which lies on the periphery of the plate. The spacer 12 is formed to have the same thickness as the final finish thickness of the memory card 1; therefore, the products are finished to a fixed thickness by pressing the resin with the spacer installed. The spacer 12 is also made of a glass plate or resin. The spacer 12 may be formed on the lower casting plate 10 so that it is made integral with the lower casting plate 10, or it may be a discrete component, which is glued to the plate, or it may be just mounted only at the time of molding. The mold release agent is applied between the lower casting plate 10 and the lower sheet member 11 and to the surface of the spacer 12 to permit easy mold release. The mold release agent, however, may be omitted if the spacer 12 is made of a material, which does not stick to the resin of the substrate 2 or if the resin of the lower casting plate 10 uses a resin, which can be easily removed from a mold.

Figure 6:
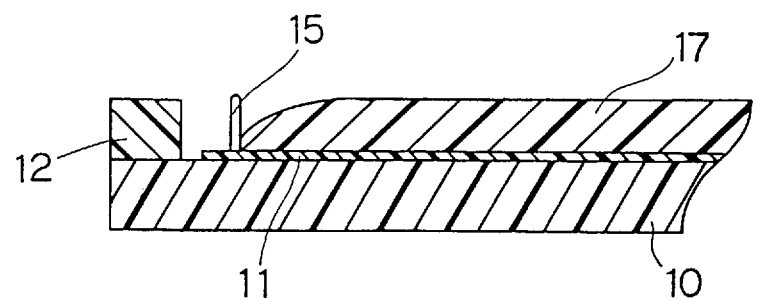
FIG. 6 is a diagram showing a step for injecting a resinous sealant of the first embodiment of the manufacturing method for the memory card according to the present invention.

As shown in FIG. 6, a resinous sealant 17 is injected into the thus formed lower casting plate 10 or the like. As the resinous sealant 17, a resin of polyurethane type or the like, which was previously discussed as the materials for the substrate 2, is used. This injection is carried out using a numerically controlled automatic injecting machine, which is capable of automatically adjusting the injection amount, bar coater, curtain coater, etc. In this case, the amount of the resinous sealant 17 to be injected can be automatically changed for an area, wherein the circuit elements 3 exist, and for an area, wherein no circuit element exists, thus permitting further efficient injection.

Figure 7:
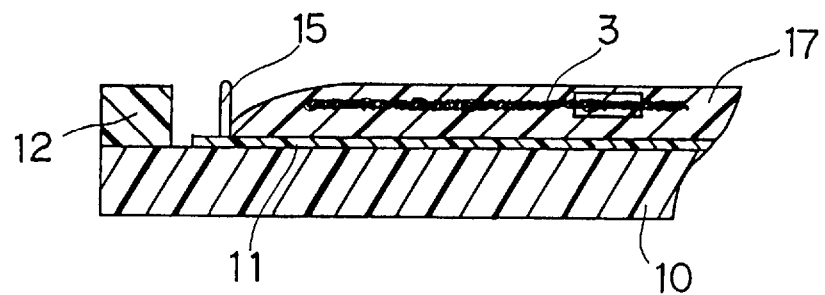
FIG. 7 is a diagram showing a step for mounting circuit elements of the first embodiment of the manufacturing method for the memory card according to the present invention.
Figure 8:
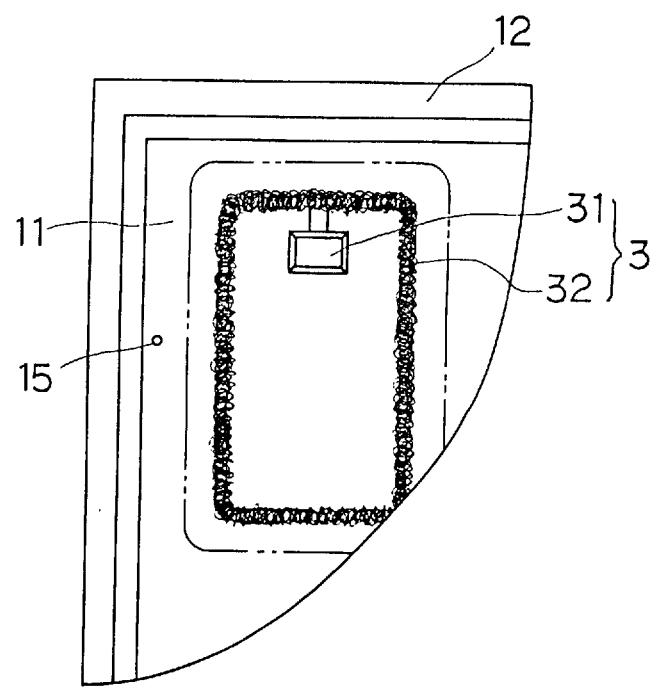
FIG. 8 is a diagram showing the mounted circuit elements observed from above in the first embodiment of the manufacturing method for the memory card according to the present invention.

After injecting the resinous sealant 17, the circuit elements 3 are mounted (FIG. 7). In this mounting step, the circuit elements 3 are embedded in the resinous sealant 17 before the injected resinous sealant 17 cures. Thus, the circuit elements 3 are sealed in the resinous sealant 17. FIG. 8 shows the mounted circuit element 3 observed from above. The drawing illustrates the semiconductor device 31 and the transmitting/receiving device 32, which are mounted in a transparent resinous sealant along the mounting position marking lines 13 of the lower sheet member 11.

Figure 9:
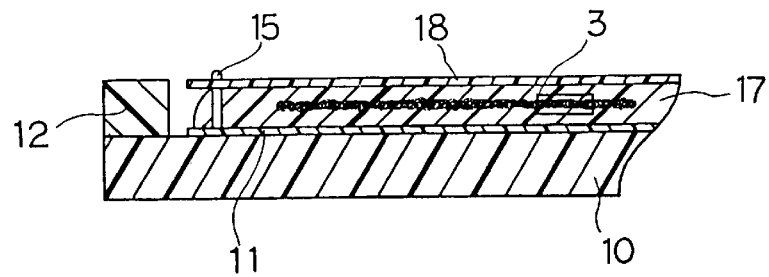
FIG. 9 is a diagram showing a step for mounting an upper sheet of the first embodiment of the manufacturing method for the memory card according to the present invention.
Figure 10:
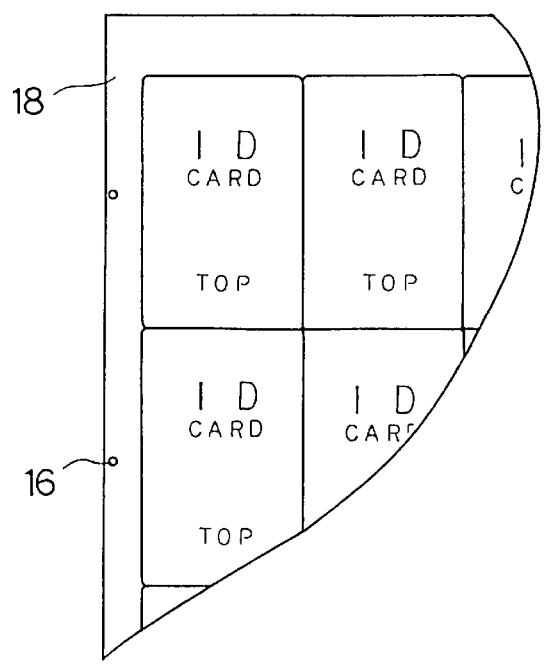
FIG. 10 is a diagram showing the mounted upper sheet observed from above in the first embodiment of the manufacturing method for the memory card according to the present invention.

After completing the packaging of the circuit elements 3, an upper sheet member 18, which will form an upper sheet 41 when the product is completed, is mounted (FIG. 9). This upper sheet member 18 is also provided with the guiding hole 16 as in the case of the lower sheet member 11. Positioning is performed by fitting the guiding post 15 into the guiding hole 16. FIG. 10 shows the mounted upper sheet member 18 observed from above. As seen from FIG. 10, the upper sheet member 18 is provided with various types of printing in accordance with the specifications of the card.

Figure 11:
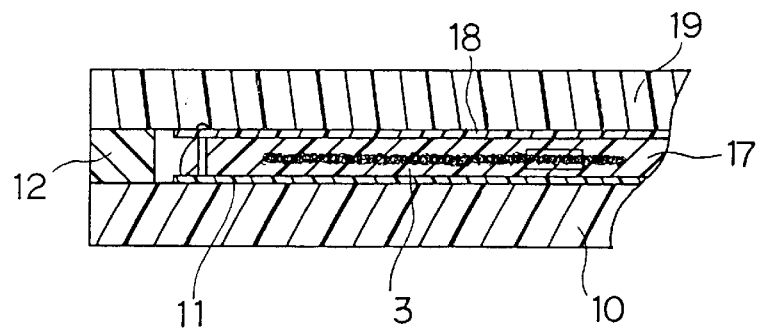
FIG. 11 is a diagram showing a cast pressing step of the first embodiment of the manufacturing method for the memory card according to the present invention.
Figure 12:
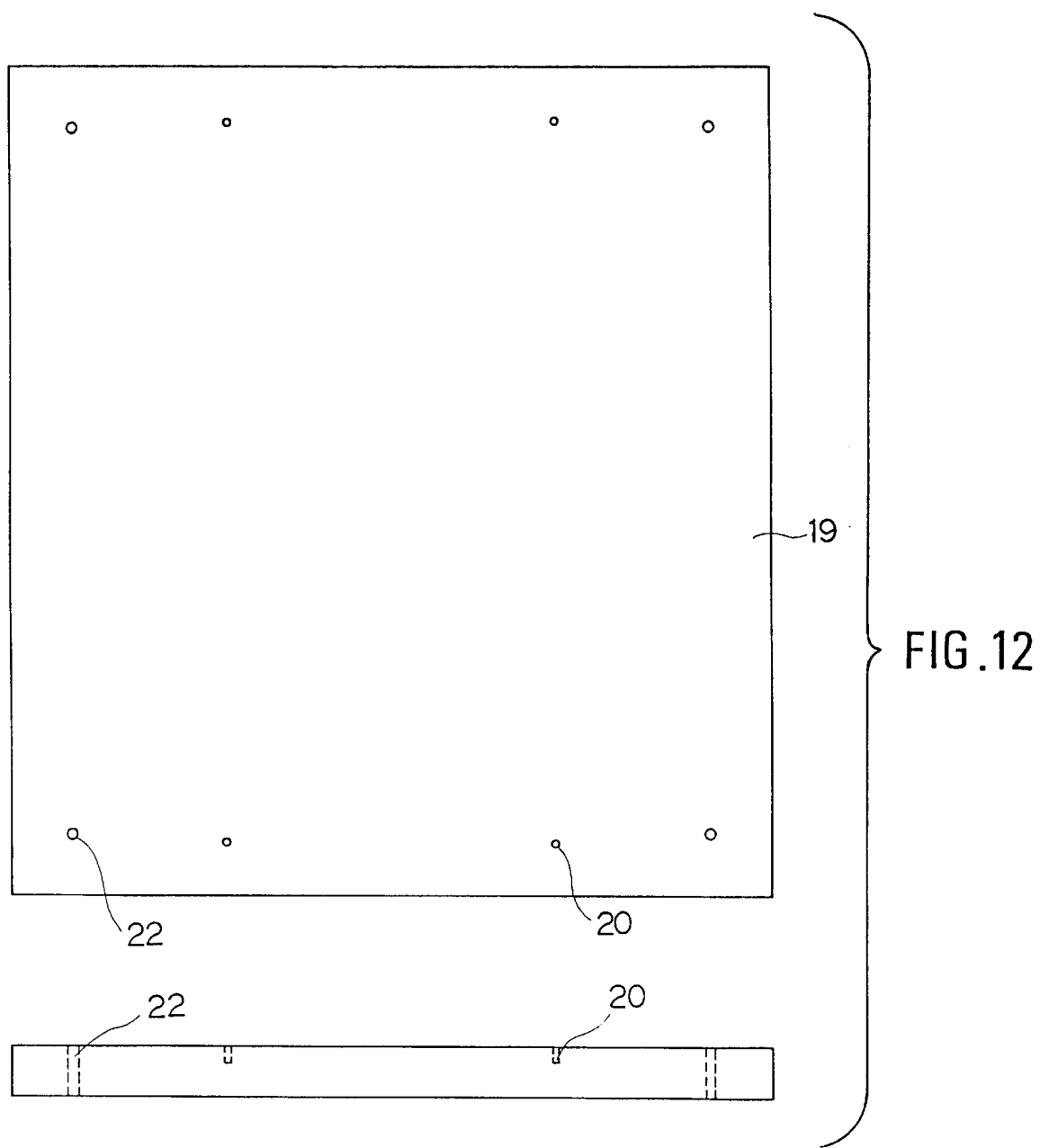
FIG. 12 is a diagram showing the configuration of an upper casting plate of the first embodiment of the manufacturing method for the memory card according to the present invention.

After mounting the upper sheet member 18 in this manner, the mold release agent is applied to the upper side, then an upper casting plate 19 is placed over it (FIG. 11). As shown in FIG. 12, this upper casting plate 19 is made of a flat glass plate or a transparent resin plate or the like as in the case of the lower casting plate 10. It is provided with a positioning guide hole 20, wherein the guiding post 15 fits, and a vent hole 22 for releasing gas produced from the resinous sealant 17 or for vacuuming. In this case also, the application of the mold release agent mentioned above may be omitted when the materials to be used exhibit good mold release properties with respect to the resinous sealant 17.

After mounting the upper casting plate 19, the upper casting plate 19 is pressed from above so that it comes in contact with the spacer 12, then the resinous sealant 17 is allowed to cure while maintaining the pressing pressure. This causes the resinous sealant 17 to solidify to the dimension of the spacer 12, i.e., the final product thickness. The gases or bubbles in the resinous sealant 17 produced at this time are naturally exhausted by pressing or forcibly exhausted by vacuuming or the like through the aforesaid vent hole 22. This removes bubbles from inside to assure a uniform internal structure.

When the resinous sealant 17 has cured, this cured intermediate product (resin body) 23 is taken out of the mold. The intermediate product 23 shown in FIG. 13 is blanked along the periphery thereof to a predetermined dimension in order to obtain the completed product shown in FIG. 1. Methods for blanking it along its periphery include press-cutting, Thompson blanking, i.e. blanking by a cutting blade having the shape to be blanked, laser-cutting, machining, engraving, and cutting by a cutting machine. Thus, blanking the completed product from the intermediate product assures the finish to a predetermined dimension and it also cuts off bubble-prone ends so that only central part, which provides a uniform cross section, may be used. In this embodiment, a mold for making six pieces at a time is shown; however, the configuration of the mold to be used is not limited to this one but a mold for producing more pieces at a time may be used. It is needless to say that a mold for making only one piece at a time may be used. Likewise, a metal may be used as the material for the mold as appropriate.

The second embodiment of the manufacturing method for the memory card according to the present invention will now be described. The parts and the like, which are identical to those of the preceding embodiment, are given the like numerals. Only brief description is given to similar steps.

This method is employed for manufacturing the aforesaid memory card of the second embodiment. This embodiment is different from the first embodiment in that it does not include the step for mounting the lower and upper sheet members 11 and 18.

FIG. 14 through FIG. 22 show the steps of the manufacturing method and the configuration of the mold. In the first step, the mold release agent is applied to the surface of the lower casting plate 10 and the spacer 12 is mounted on it.

The lower casting plate 10 used in this step is also made of a glass plate or a transparent resinous plate, which is 10 to 20 mm thick. Unlike the case of the first embodiment, the mounting position marking lines 13 and the dimension marking line 14 are provided on the casting plate 10 itself. In this embodiment, these marking lines 13 and 14 are drawn from the back side of the lower casting plate 10 by printing or marking-off.

Figure 15:
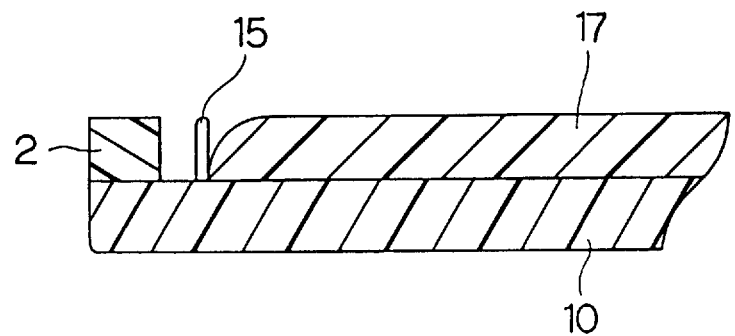
FIG. 15 is a diagram showing a step for injecting a resinous sealant in the second embodiment of the manufacturing method for the memory card according to the present invention.
Figure 16:
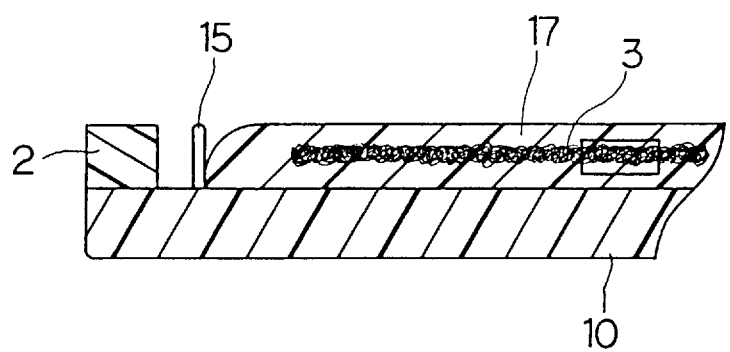
FIG. 16 is a diagram showing a step for mounting circuit elements in the second embodiment of the manufacturing method for the memory card according to the present invention.
Figure 17:
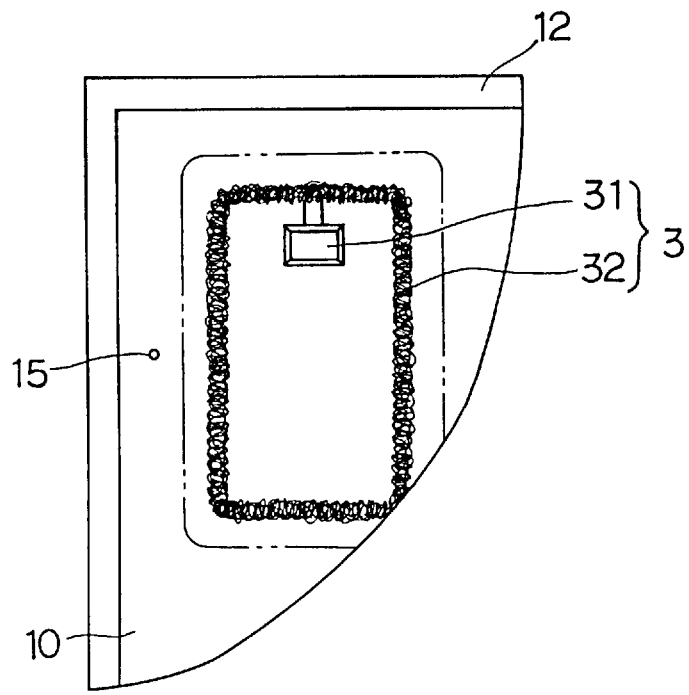
FIG. 17 is a diagram showing the mounted circuit elements observed from above in the second embodiment of the manufacturing method for the memory card according to the present invention.
Figure 18:
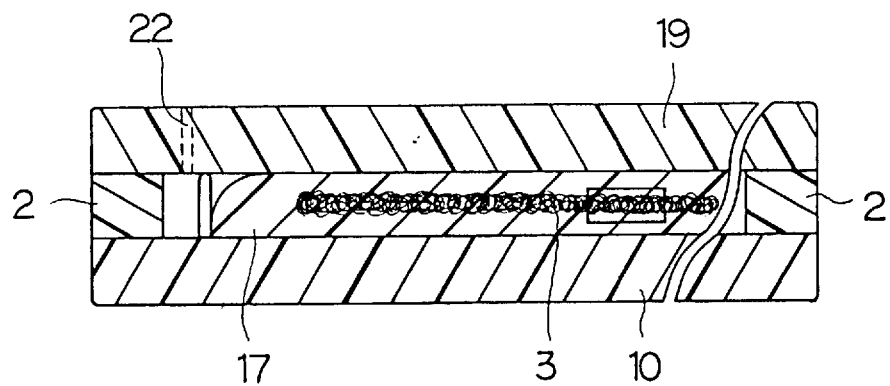
FIG. 18 is a diagram showing a cast pressing step of the second embodiment of the manufacturing method for the memory card according to the present invention.
Figure 19:
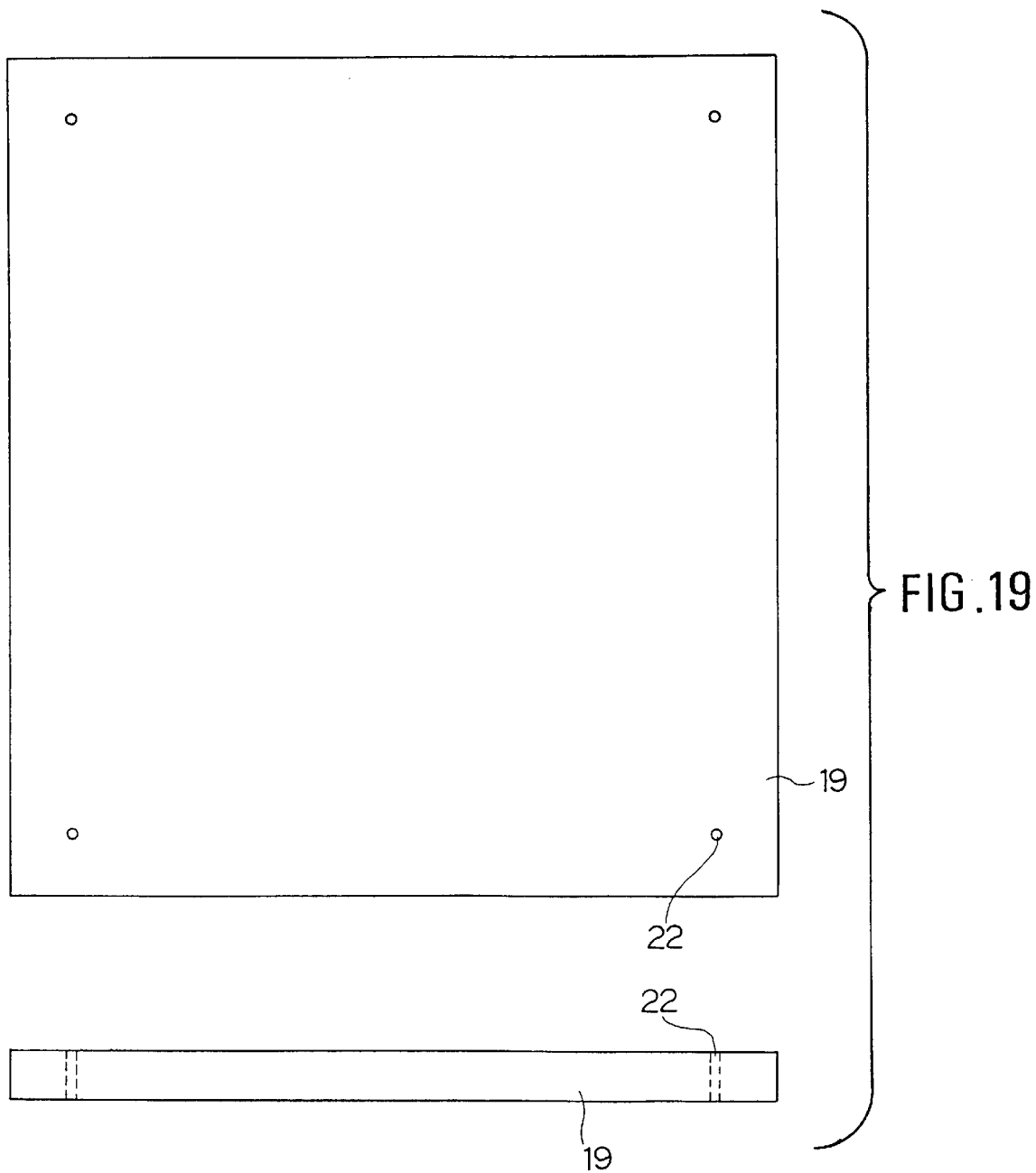
FIG. 19 is a diagram showing the configuration of an upper casting plate of the second embodiment of the manufacturing method for the memory card according to the present invention.

In the next step of the embodiment, the resinous sealant 17 is directly injected onto the lower casting plate 10 (FIG. 15). Then, the circuit elements 3 are mounted (FIG. 16 and FIG. 17) and an upper casting plate 19 is placed over the resinous sealant 17 via the mold release agent (FIG. 18). In this embodiment, the upper casting plate 19 is provided with the vent hole 22, through which gases are exhausted from the resinous sealant 17 (FIG. 19). In this embodiment, the upper casting plate 19 is not provided with the guiding hole 20, which fits with the guiding post 15; however, there would be no problem of course with providing the guiding hole.

Figure 20:
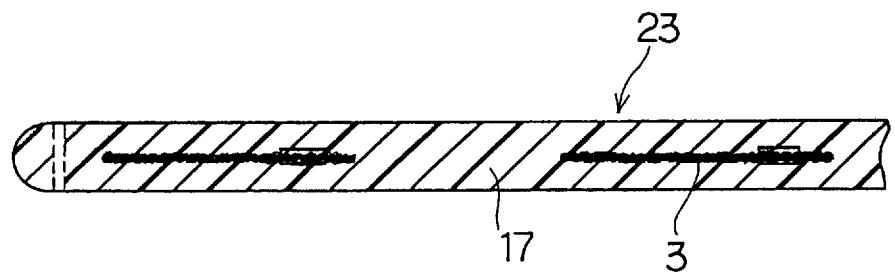
FIG. 20 is a diagram showing an intermediate product of the second embodiment of the manufacturing method for the memory card according to the present invention.
Figure 21:
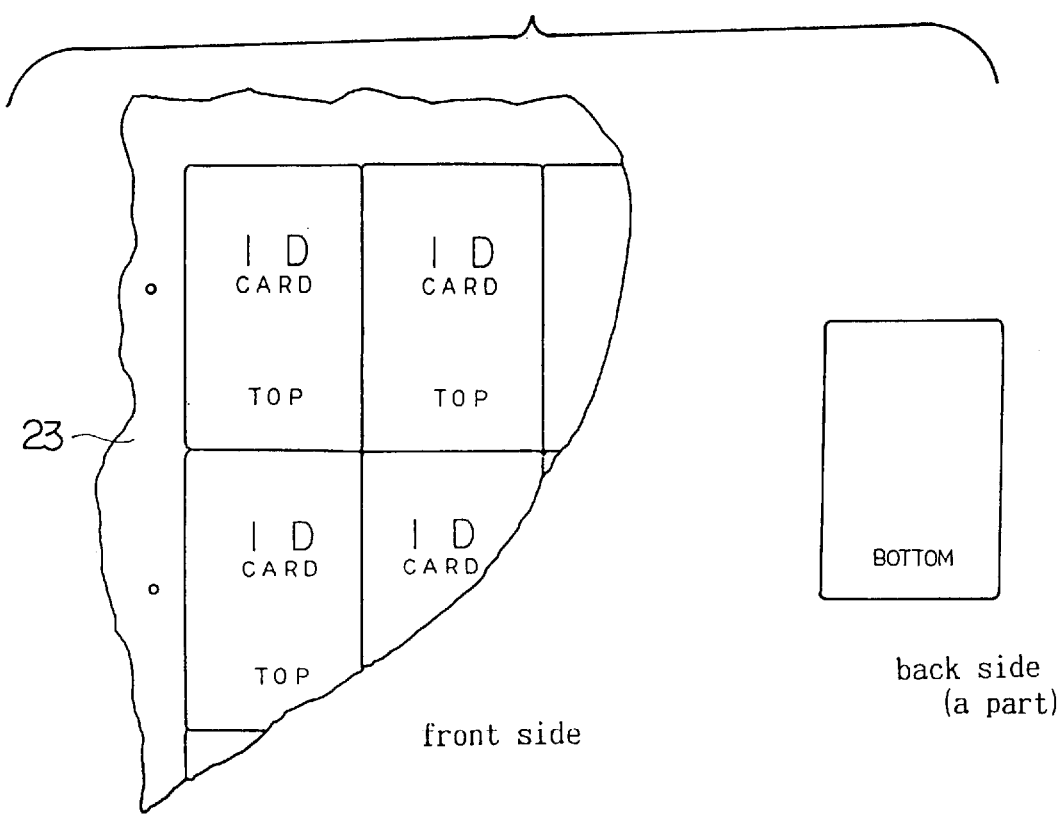
FIG. 21 is a diagram showing the intermediate product, on which printing has been done, of the second embodiment of the manufacturing method for the memory card according to the present invention.

The upper casting plate 19, which has been mounted, is appropriately pressed until the resin cures (FIG. 18), then predetermined patterns and/or characters are printed (FIG. 21) on the intermediate product 23 (FIG. 20). The printing may be given by screen printing, offset printing, seal printing or other printing method on one side or both sides according to the specifications of the card. Other methods or means such as painting and hot stamping may be used to print patterns and/or characters on the surfaces rather than limiting to just printing.

Figure 22:
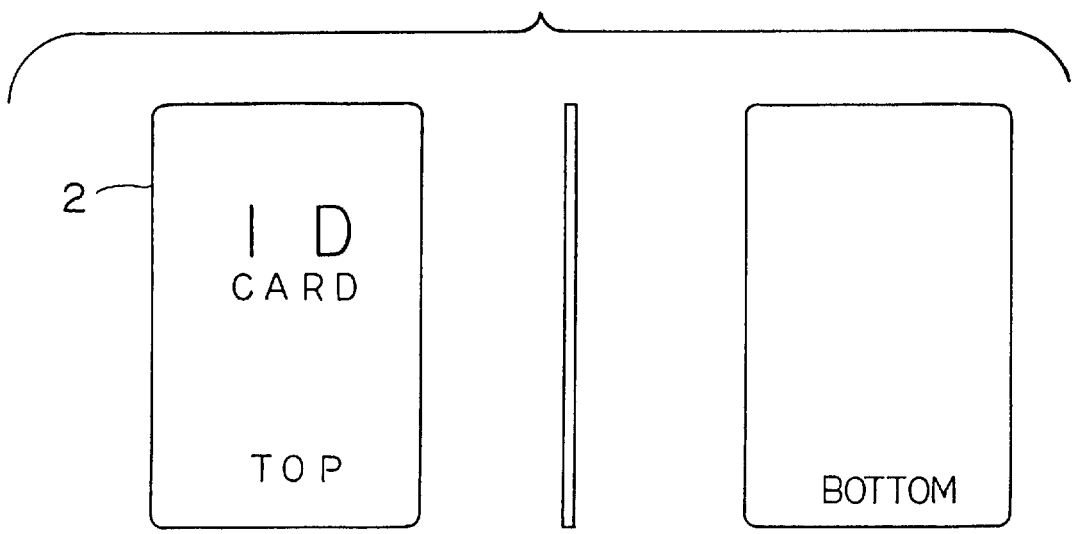
FIG. 22 is a diagram showing a completed product of the second embodiment of the manufacturing method for the memory card according to the present invention.

After finishing the printing, the intermediate product 23 is blanked out along the periphery thereof to obtain a completed product (FIG. 22). Unlike the previous embodiment, the circuit elements 3 are just sealed in the substrate 2 with no sheet 4 provided. This configuration presents such advantages as lower cost and a simpler manufacturing process.

FIG. 23 through FIG. 31 show the manufacturing steps and the configuration of the mold in the third embodiment of the manufacturing method for the memory card according to the present invention. This is the method for manufacturing the memory card of the third embodiment discussed above, with a step for mounting the frame 21 added.

Figure 23:
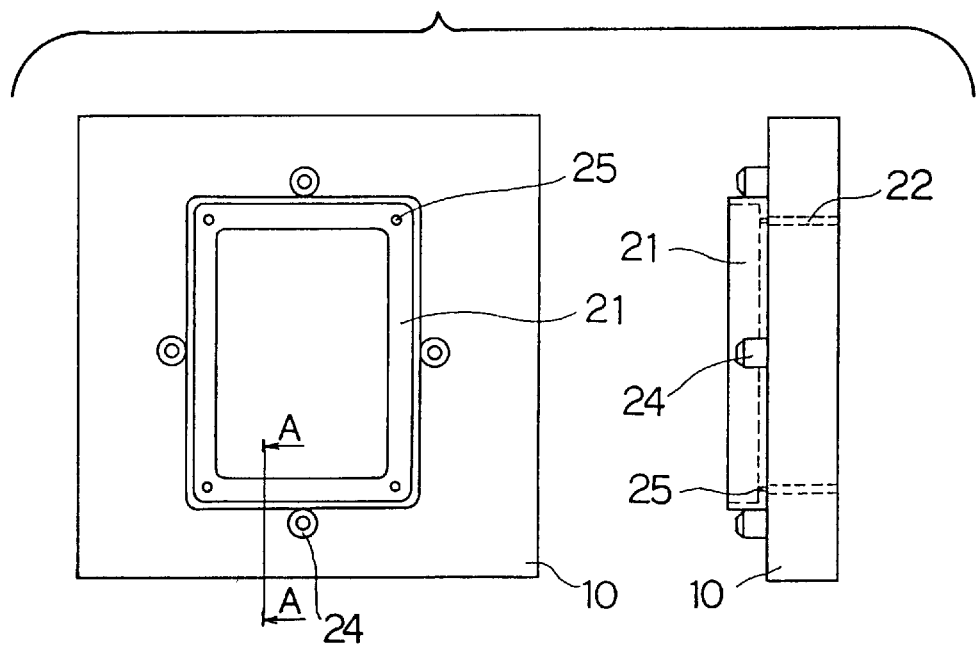
FIG. 23 is a diagram showing a step for mounting a frame in a third embodiment of the manufacturing method for the memory card according to the present invention.
Figure 24:
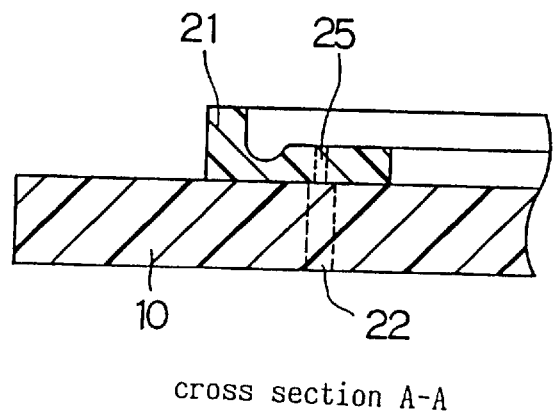
FIG. 24 is a cross-sectional view taken along line A—A of FIG. 23.
Figure 25:
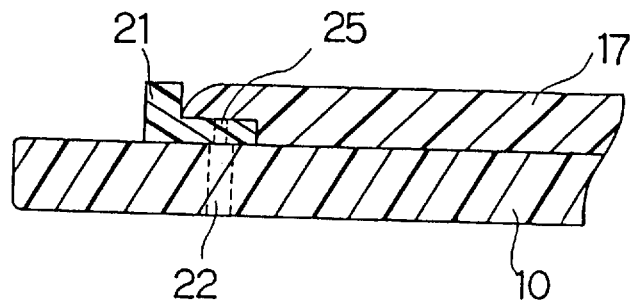
FIG. 25 is a diagram showing a step for injecting a resinous sealant in the third embodiment of the manufacturing method for the memory card according to the present invention.

Since the frame 21 is used in this manufacturing process, there is no need to use the spacer 12, which is used in the previous embodiment. Therefore, in the first step, the frame 21 is mounted on the lower casting plate 10. FIG. 23 shows the frame 21, which has been installed on the lower casting plate 10. FIG. 24 gives the cross-sectional view (cross section A—A), which illustrates the details of a part thereof. In this case, as shown in FIG. 23, the lower casting plate 10 is provided with a positioning post 24 for positioning the frame 21. In the case of this embodiment, the lower casting plate 10 is provided with the vent hole 22, which is communicated with a vent hole 25 provided in the frame 21.

Figure 26:
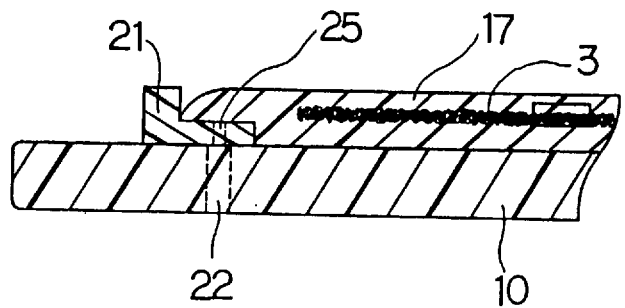
FIG. 26 is a diagram showing a step for mounting circuit elements in the third embodiment of the manufacturing method for the memory card according to the present invention.
Figure 27:
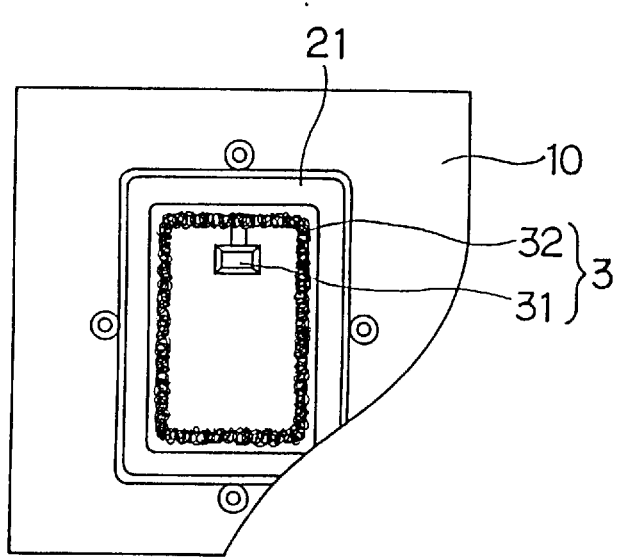
FIG. 27 is a diagram showing the mounted circuit elements observed from above in the third embodiment of the manufacturing method for the memory card according to the present invention.
Figure 28:
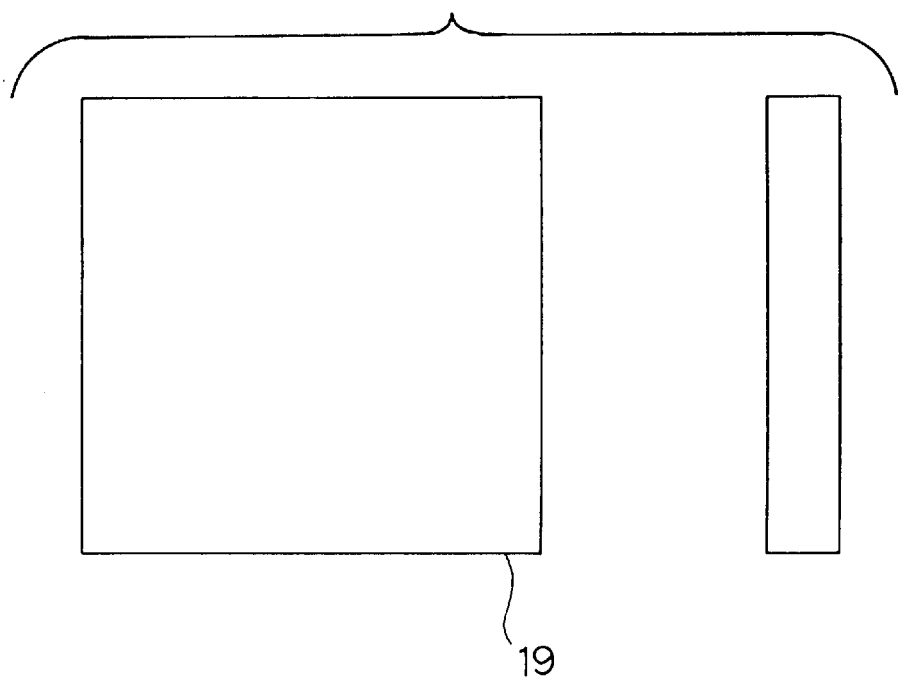
FIG. 28 is a diagram showing the configuration of an upper casting plate of the third embodiment of the manufacturing method for the memory card according to the present invention.
Figure 29:
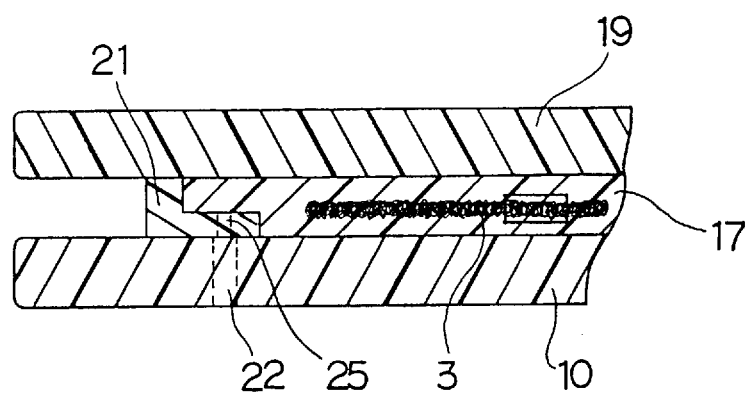
FIG. 29 is a diagram showing a cast pressing step of the third embodiment of the manufacturing method for the memory card according to the present invention.
Figure 30:
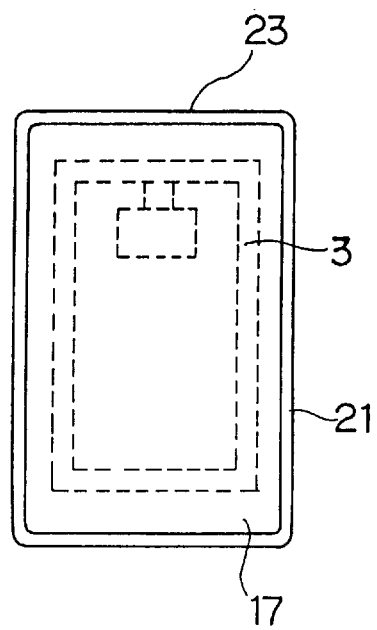
FIG. 30 is a diagram showing an intermediate product of the third embodiment of the manufacturing method for the memory card according to the present invention.
Figure 31:
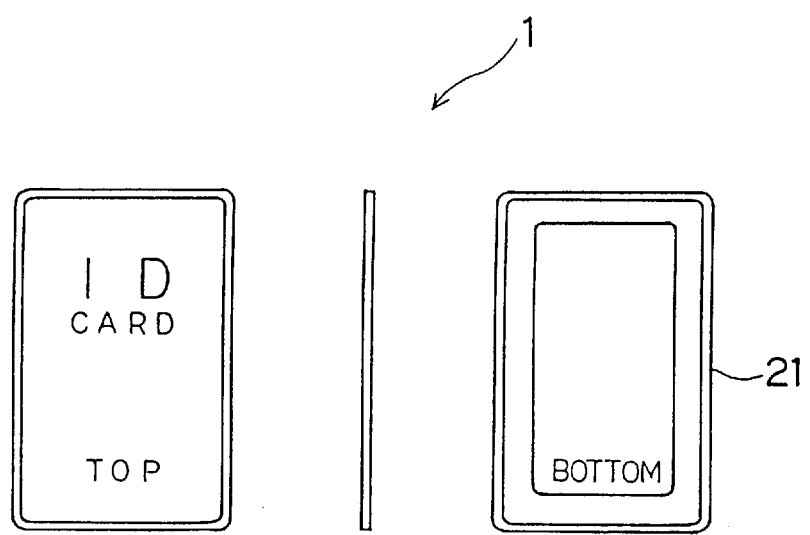
FIG. 31 is a diagram showing a completed product of the third embodiment of the manufacturing method for the memory card according to the present invention.

Then, the resinous sealant 17 is injected also in this embodiment (FIG. 25) and the circuit elements 3 are mounted (FIG. 26 and FIG. 27). The upper casting plate 19 (FIG. 28) is placed over the resinous sealant and pressed (FIG. 29). After the resin cures, the intermediate product 23 is taken out (FIG. 30) and provided with printing, thus completing the product (FIG. 31). In the case of this embodiment, the resinous sealant 17 is injected within the frame 21 as mainly shown in FIG. 25 and FIG. 26. Hence, excess resinous sealant 17 is discharged with gases through the vent holes 22 and 25. This eliminates the need for blanking the intermediate product 23 along the periphery thereof. Moreover, the last printing step may be skipped as appropriate, or patterns or characters may be formed at the time of molding by the upper and lower casting plates 10 and 19. Further, it is possible to form a mark or marks on the frame 21 when molding it.

The fourth embodiment of the manufacturing method will now be explained. FIG. 32 through FIG. 41 illustrate the steps of the manufacturing method and the configuration of the mold. This method is employed to manufacture the fourth embodiment of the aforesaid memory card. This example relates to the method for manufacturing a memory card, which uses the frame 21 and has the sheet 4 covering the surfaces of the card.

Figure 32:
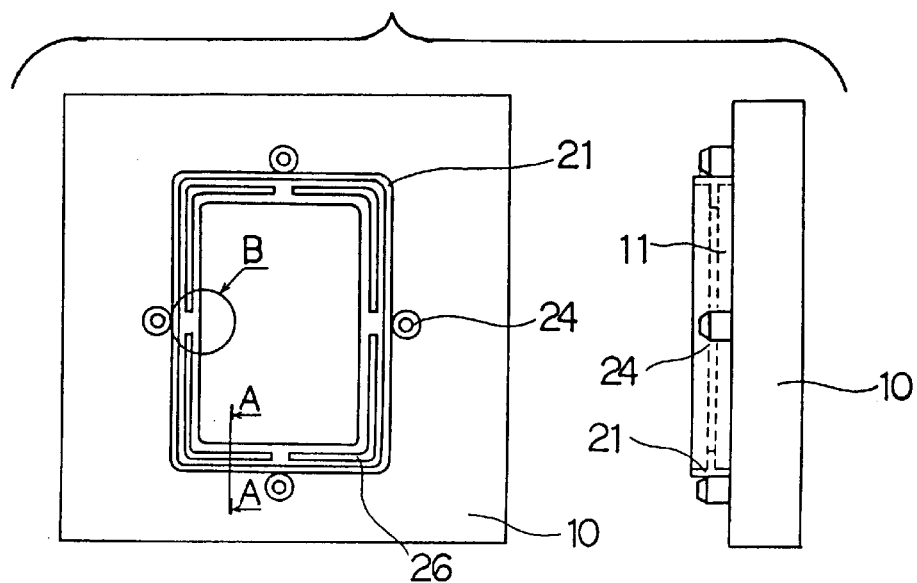
FIG. 32 is a diagram showing a step for mounting a frame in a fourth embodiment of the manufacturing method for the memory card according to the present invention.
Figure 33:
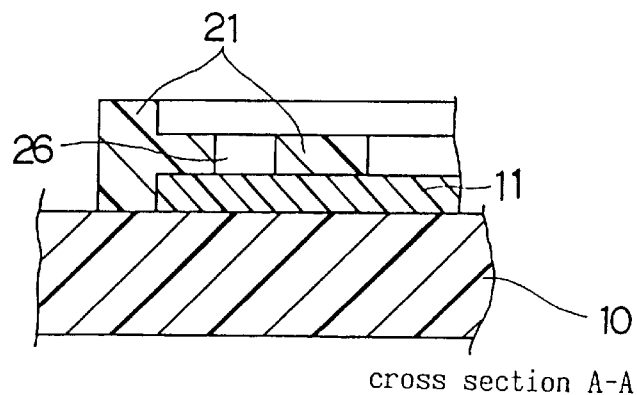
FIG. 33 is a cross-sectional view taken along line A—A of FIG. 32.
Figure 34:
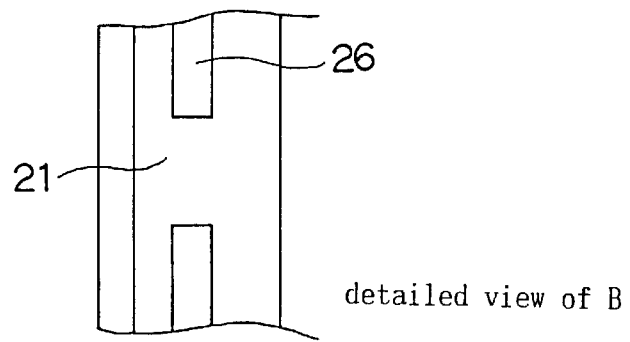
FIG. 34 is a diagram showing the details of part B of FIG. 32.
Figure 35:
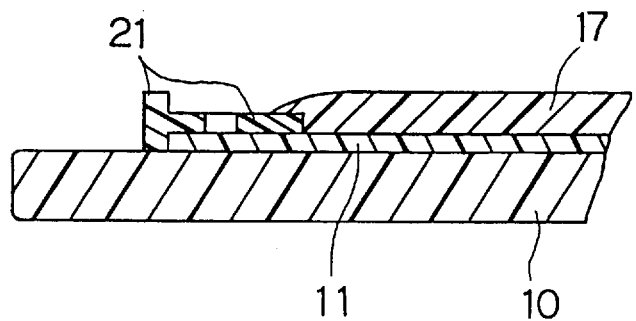
FIG. 35 is a diagram showing a step for injecting a resinous sealant in the fourth embodiment of the manufacturing method for the memory card according to the present invention.
Figure 36:
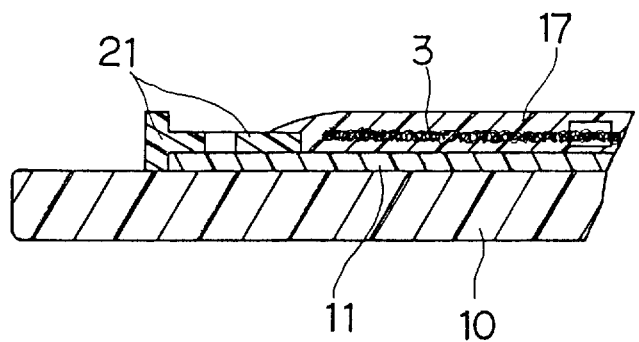
FIG. 36 is a step for mounting circuit elements in the fourth embodiment of the manufacturing method for the memory card according to the present invention.
Figure 37:
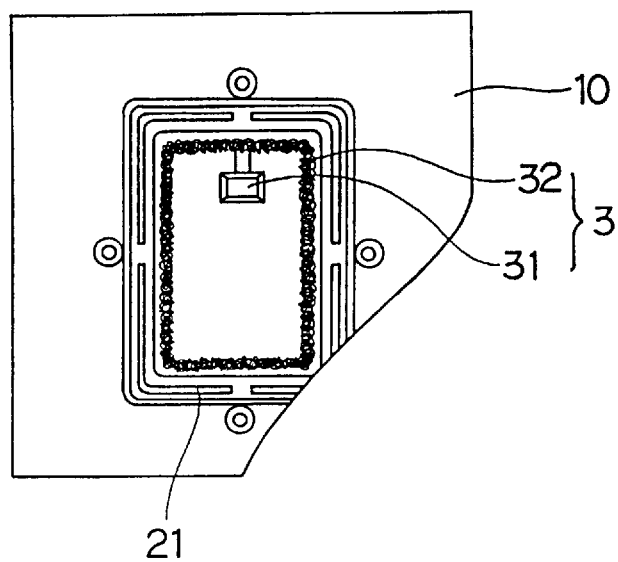
FIG. 37 is a diagram showing a step for mounting an upper sheet in the fourth embodiment of the manufacturing method for the memory card according to the present invention.
Figure 38:
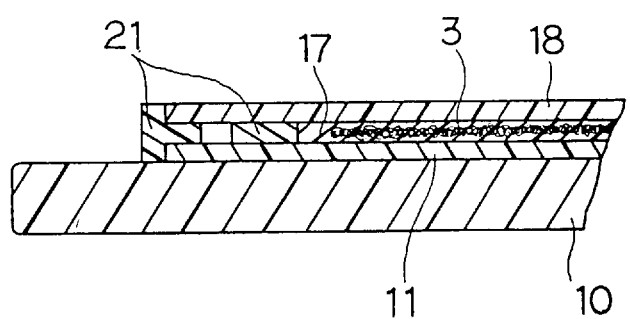
FIG. 38 is a diagram showing the mounted circuit elements observed from above in the fourth embodiment of the manufacturing method for the memory card according to the present invention.
Figure 39:
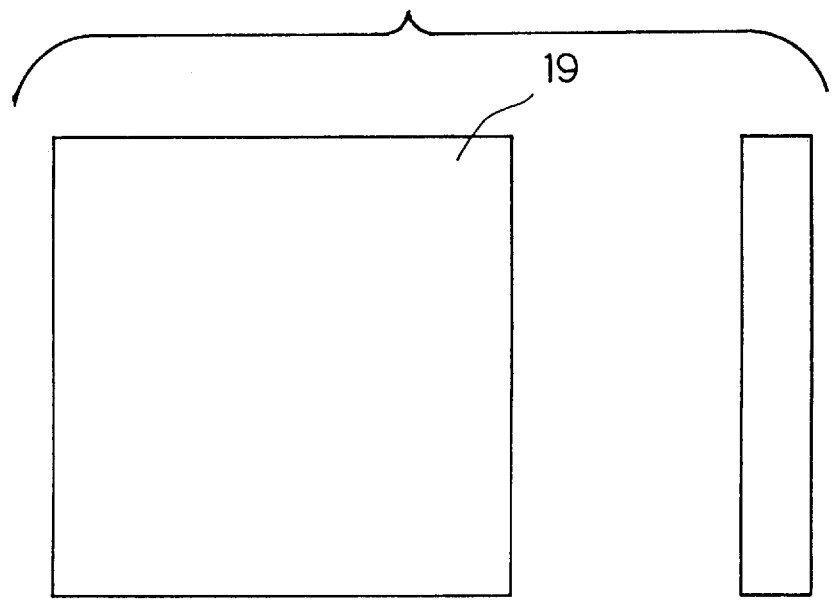
FIG. 39 is a diagram showing the configuration of an upper casting plate of the fourth embodiment of the manufacturing method for the memory card according to the present invention.
Figure 40:
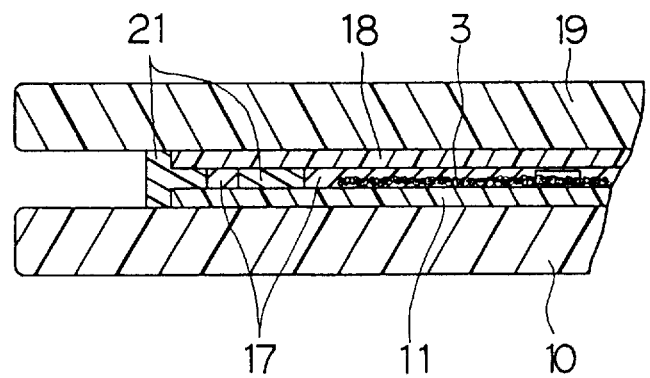
FIG. 40 is a diagram showing a cast pressing step of the fourth embodiment of the manufacturing method for the memory card according to the present invention.

In the first step of this method, the frame 21 and the lower sheet member 11 are placed on the lower casting plate 10. FIG. 32 shows the frame 21 and the lower sheet member 11, which have been mounted on the lower casting plate 10, and FIG. 33 and FIG. 34 give the detailed views of a part thereof. As shown in FIG. 32, the lower casting plate 10 is provided with the positioning post 24 as in the case of the previous third embodiment. The lower sheet member 11 is cut to a predetermined dimension in advance to match the dimension of the frame 21. The frame 21 is provided with a relief hole 26 to relieve excess resinous sealant when the resinous sealant 17 is pressed (FIG. 32 and FIG. 34). As in the previous embodiment, this embodiment also has the step for injecting the resinous sealant 17 (FIG. 35), the step for mounting the circuit elements 3 (FIG. 36 and FIG. 37), the step for placing the upper sheet member 18 (FIG. 38), and the step for placing the upper casting plate 19 (FIG. 39) on the upper sheet member 18 and pressing the upper casting plate 19 (FIG. 40).

In a cast pressing step of this embodiment, excess resinous sealant 17 flows through the relief hole 26 provided in the frame 21. This allows the excess resinous sealant to be absorbed without adding any special structure to the mold.

Figure 41:
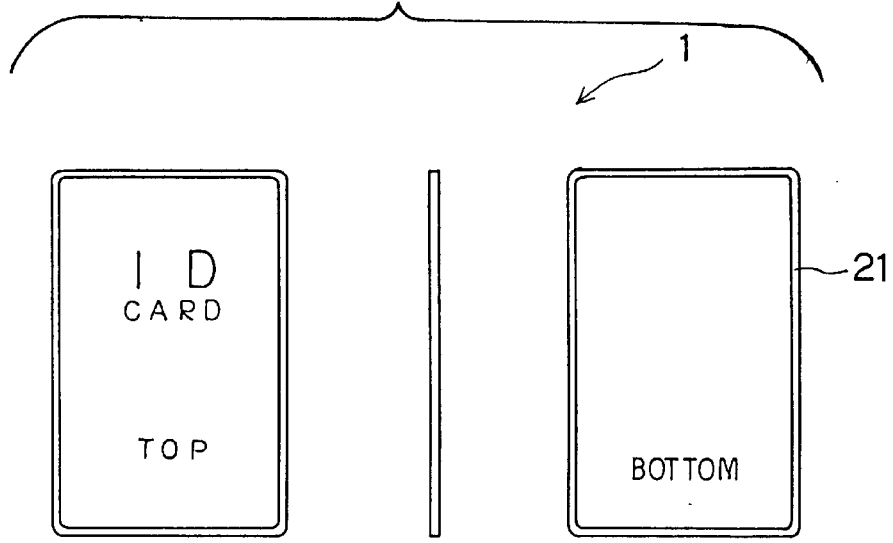
FIG. 41 is a diagram showing a completed product of the fourth embodiment of the manufacturing method for the memory card according to the present invention.

After the resin cures, the intermediate product 23 is taken out and provided with printing or the like to be completed (FIG. 41). As in the case of the third embodiment, this embodiment also employs the frame 21, eliminating the need of blanking the intermediate product 23 along the periphery thereof. In the third and fourth embodiments, the mold for producing one piece at a time is used; however, it is of course possible to use a mold designed to produce a plurality of pieces at a time by increasing the number of gates.

The following describes the fifth embodiment of the manufacturing method for the memory card according to the present invention. FIG. 42 through FIG. 49 show the steps of the manufacturing process and the configuration of the told according to this embodiment.

In this embodiment, glue print is provided on the lower sheet member 11 to position and preliminarily install the circuit elements 3 and the spacer 12.

Figure 42:
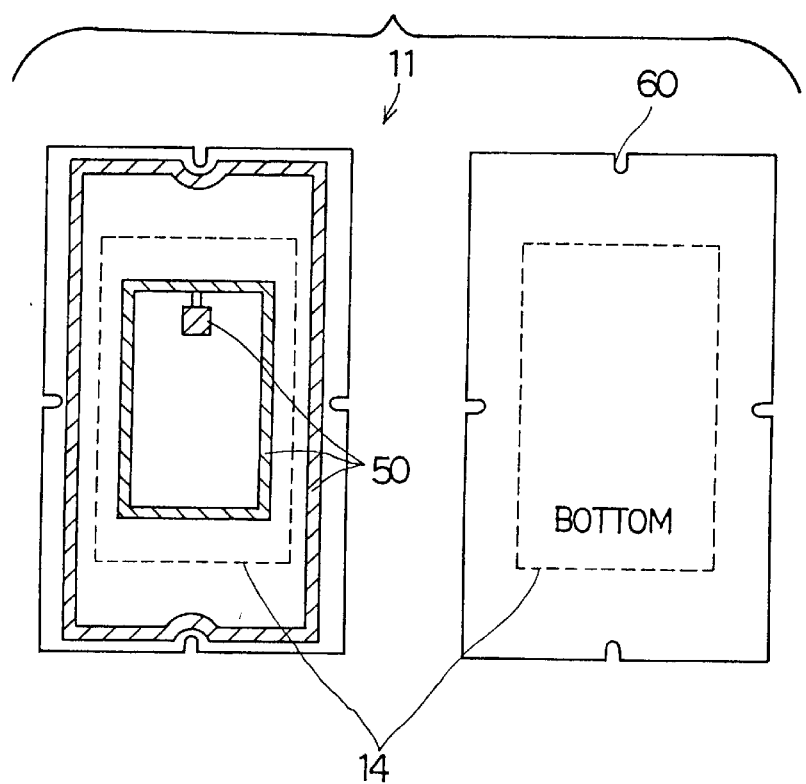
FIG. 42 is a diagram showing the configuration of a lower sheet of a fifth embodiment of the manufacturing method for the memory card according to the present invention.

As illustrated in FIG. 42, glue-printed sections 50 are provided on the back surface (on the circuit element side) of the lower sheet member 11 used in this embodiment. In this case, the dimension of the lower sheet member 11 is made larger than that of the finished product. For instance, if the finished product is 85.6×54 mm, then the size of the lower sheet member 11 should be formed to 115.6×84 mm. The lower sheet member 11 is provided with guiding notches 60 for positioning the lower sheet member in relation to the lower casting plate 10. As in the case of other embodiments, characters and patterns are printed on the front surface of the lower sheet member 11.

In the first step of the process, the lower sheet member 11 is given the glue printing. To form the glue-printed sections 50, a sticky material is used as ink, which is used to print a predetermined pattern and dried. In this embodiment, the glue print is given in places where the circuit elements 3 and the spacer 12 are to be mounted. The ink is dried by natural drying, heat drying, UV drying, etc., the UV drying being optimal for mass production because it requires a shorter time for drying and causes no deformation. The glue-printed sections 50 may be transparent or colored.

Figure 43:
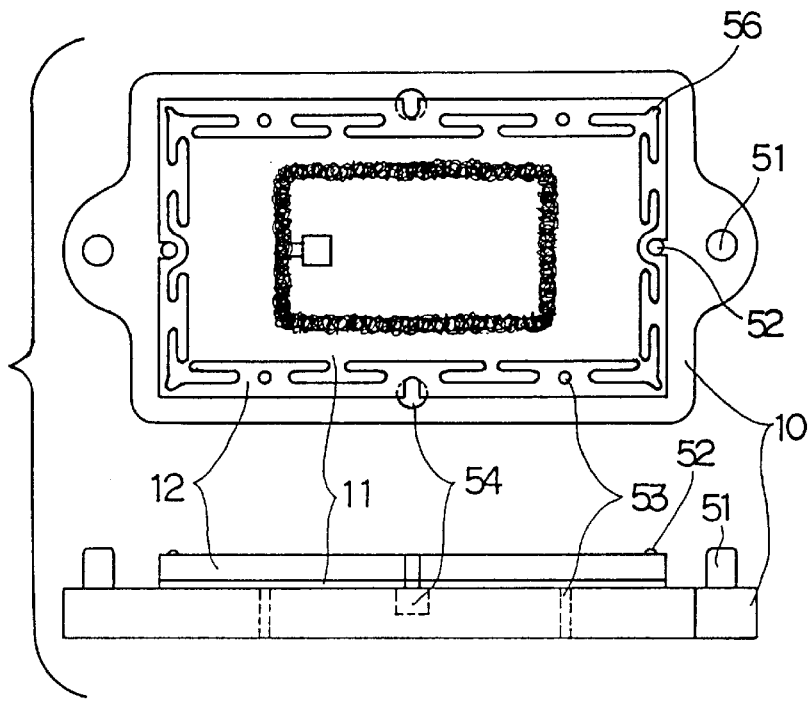
FIG. 43 is a diagram showing the lower sheet member, spacer, and circuit elements mounted on the lower casting plate of the fifth embodiment of the manufacturing method for the memory card according to the present invention.

After the glue printing step, the lower sheet member 11 is mounted on the lower casting plate 10, then the circuit elements 3 and the spacer 12 are placed on the lower sheet member 11 (FIG. 43). This causes the circuit elements 3 and the spacer 12 to be positioned on the lower sheet member 11 and preliminarily installed on the lower sheet member 11. The circuit elements 3 or the spacer 12 may be mounted first or they may be mounted at the same time.

Figure 44:
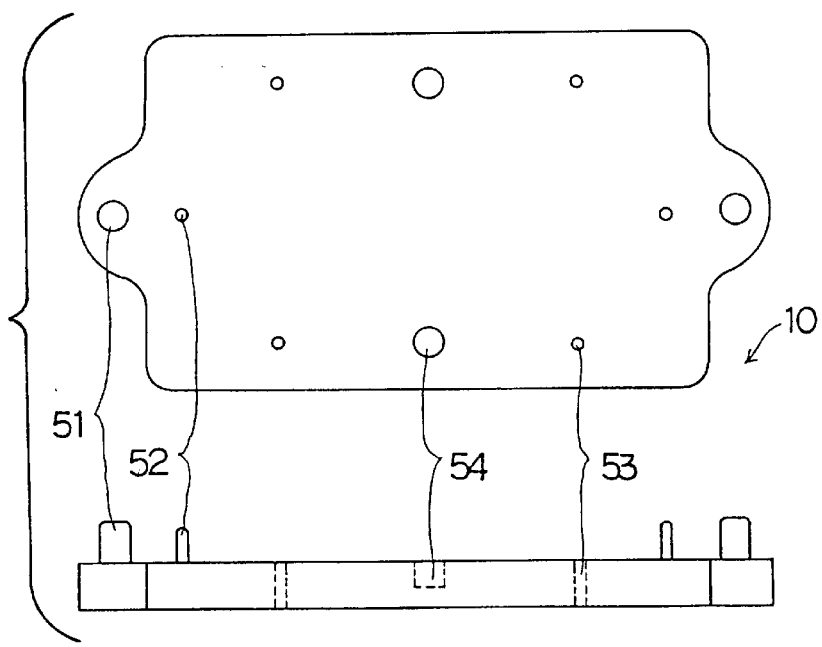
FIG. 44 is a diagram showing the configuration of the lower casting plate of the fifth embodiment of the manufacturing method for the memory card according to the present invention.

As shown in FIG. 44, the lower casting plate 10 used in this embodiment is equipped with a guiding post 51 for positioning the casting plate, a guiding pin 52 for positioning the lower sheet member 11, a vacuum hole 53 for fixing the sheet, and a relief hole 54 for the guiding pin of the upper casting plate 19. In this case, the lower sheet member 11 is positioned by the guiding pin 52 and the guiding notches 60, and it is suctioned from outside the mold via vacuum holes 53 provided in the four corners, thus being attached and fixed onto the lower casting plate 10.

Further in this embodiment, the spacer 12 is mounted on the lower sheet member 11. Accordingly, the thickness of the spacer 12 is set so that the thickness of the spacer plus the thicknesses of the upper and lower sheet members 11 and 18 equal the thickness of the finished product. For instance, if the thickness of the finished product is equal to or less than 0.8 mm (±80 $\mu$), then the thicknesses of the upper and lower sheet members 11 and 18 are respectively set to 0.1 mm and the thickness of the spacer 12 is set to 0.6 mm. At this time, it should be noted that the glue-printed sections 50 also has a thickness of about 10$\mu$ and contraction rate of the synthetic resin.

Hereupon, JIS (Japanese Industrial Standard) provides that the thickness of said finished product must be 0.76 mm, and according to the experiment done by the present inventor, the finished product having approximately the same thickness as this was got.

After the lower sheet member 11, the spacer 12 and the circuit elements 3 are mounted on the lower casting plate 10 in such a manner, the resinous sealant 17 is injected (FIG. 45).

In the next step of this embodiment, with the upper sheet member 18 suctioned to the upper casting plate 19, the upper casting plate 19 is placed over the lower casting plate (FIG. 46), and it is pressed. After the resin cures, the intermediate product 23 is taken out and the finished product (FIG. 49) is press-cut.

Figure 47:
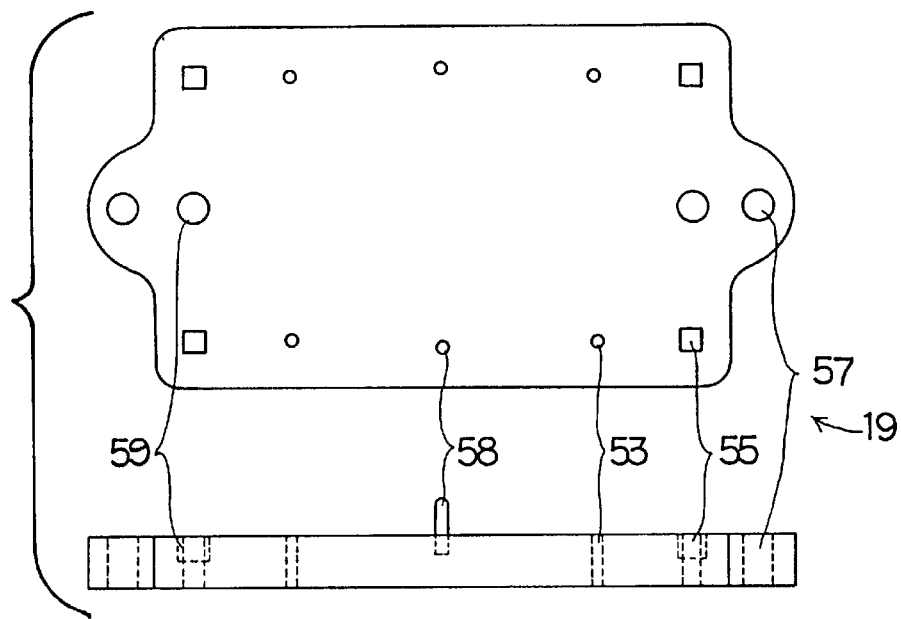
FIG. 47 is a diagram showing the configuration of the upper casting plate of the fifth embodiment of the manufacturing method for the memory card according to the present invention.

In this case, as shown in FIG. 47, the upper casting plate 19 is also provided with the vacuuming hole 53 for fixing the sheet as in the lower casting plate 10. The lower sheet member 11 is suctioned to the upper casting plate 19 through the vacuum hole. The upper casting plate 19 is provided with air vent holes 55 for letting the air out from inside the sheet. The air vent holes correspond to notches 56 for letting the air out from inside the sheets of the lower sheet member 11 and the upper sheet member 18 and they control the occurrence of bubbles by draining the air from inside the product. Further, corresponding to the lower casting plate 10, the upper casting plate 19 is provided with fitting holes 57 for the guiding posts 51, guiding pins 58 for positioning the upper sheet member 18, and relief holes 59 for guiding pins 52 (FIG. 46).

Figure 48:
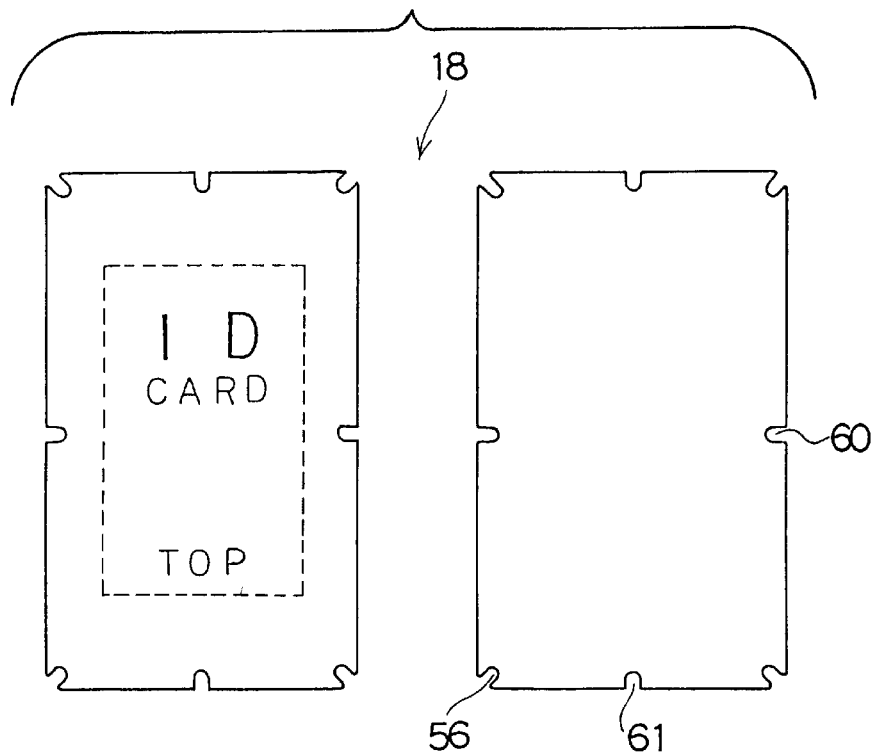
FIG. 48 is a diagram showing the configuration of an upper sheet of the fifth embodiment of the manufacturing method for the memory card according to the present invention.
Figure 49:
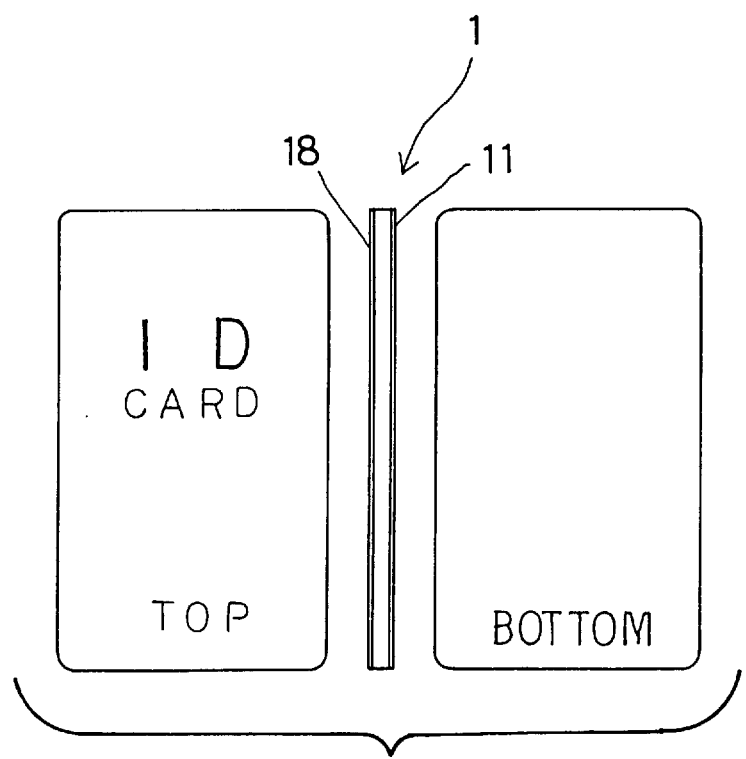
FIG. 49 is a diagram showing a completed product of the fifth embodiment of the manufacturing method for the memory card according to the present invention.

As shown in FIG. 48, the upper sheet member 18 carries predetermined printed characters and the like on the front surface thereof as in other embodiments. The upper sheet member used in this embodiment is equipped with positioning guide notches 60, which fit with the guiding pins 58, notches 61 for releasing the guiding pins 52, and notches 56 for venting the air from inside the sheet. When press-cutting the final product, the guiding notches 60 for the lower sheet member 11 or the upper sheet member 18 are used for positioning.

The process in this embodiment includes a step for providing the lower sheet member 11 with glue print; however, this step may be omitted by providing the lower sheet member 11 with glue in advance. In this case, it is desirable to attach release paper to the glue-printed sections 50 to protect them from dust or the like. In this embodiment, an example of a mold for producing one card at a time is shown; however, it is needless to say that a mold for producing a plurality of cards may be used.

The following gives further description of the fourth embodiment of the memory card in accordance with the present invention. FIG. 50 through FIG. 54 illustrate primarily the configuration of the memory card and the manufacturing process therefor. For the same components as those of the preceding embodiments, the drawings used for the preceding embodiments will be referred to for the explanation.

Figure 50:
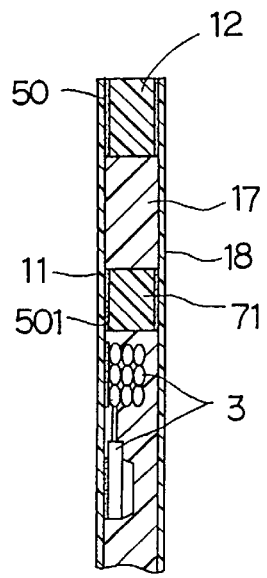
FIG. 50 is a partial cross-sectional view of an intermediate product of the forth embodiment of the memory card according to the present invention.
Figure 51:
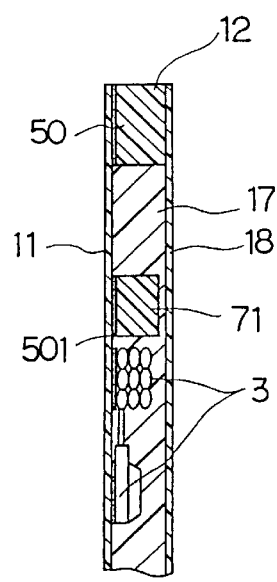
FIG. 51 is a partial cross-sectional view of an intermediate product of another aspect of the forth embodiment of the memory card according to the present invention.

As shown in the fragmentary sectional view of an intermediate product of FIG. 50 and FIG. 51, the memory card according to the present embodiment further includes an in-card spacer 71 (a second spacer) in addition to the circuit elements 3 and the resinous sealant 17. The memory card in accordance with the embodiment is characterized by this in-card spacer 71, which provides this memory card with higher strength than the memory cards according to other embodiments and high rigidity against bending or twisting.

Figure 52:
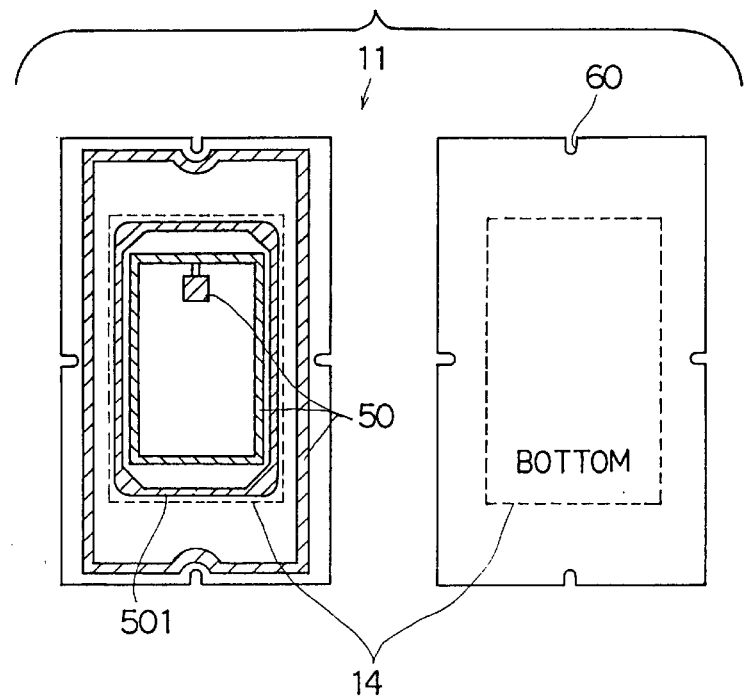
FIG. 52 is a diagram showing the configuration of a lower sheet for using the manufacturing for the forth embodiment of the memory card according to the present invention.

The lower sheet member 11 employed in this embodiment also has the glue-printed sections 50 on the back as shown in FIG. 52. The memory card in accordance with this embodiment is provided with glue-printed sections 501 for the in-card spacer 71 in addition to those illustrated in FIG. 42.

Figure 53:
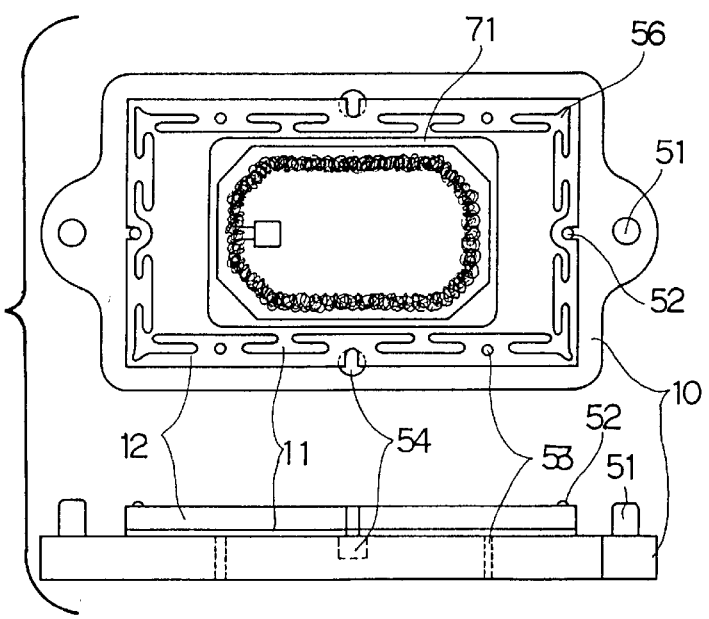
FIG. 53 is a diagram showing the situation of mounting a lower sheet member, a spacer, an in-card spacer, and circuit elements on the lower casting plate for using the manufacturing for the forth embodiment of the memory card according to the present invention.
Figure 54:
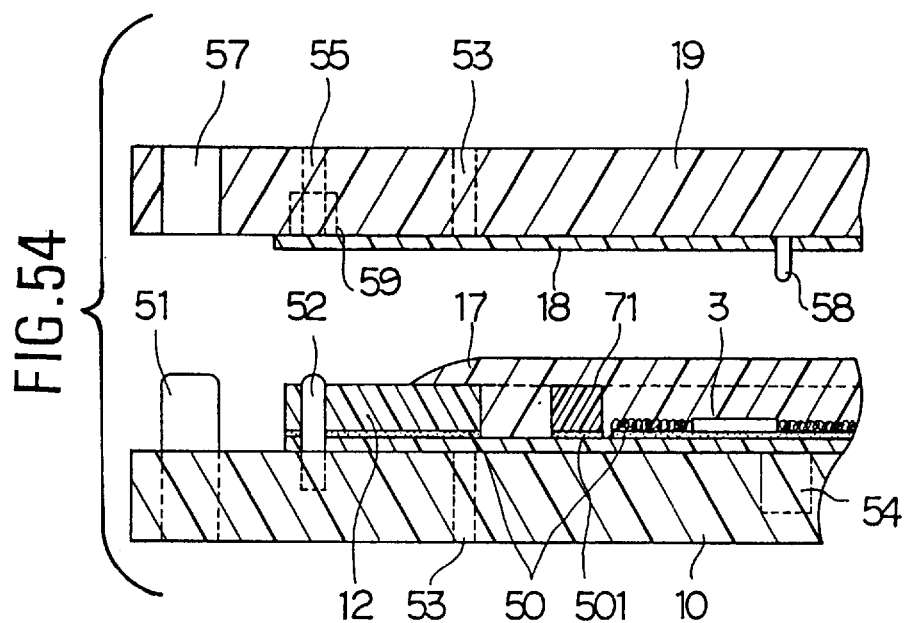
FIG. 54 is a diagram showing a step for mounting the upper casting plate onto the lower caseing plate in the manufacturing of the forth embodiment of the memory card according to the present invention.

As in the case of the preceding embodiments, the lower sheet member 11 is placed on the lower casting plate 10 after the glue printing step in this embodiment. Then, the circuit elements 3, the spacer 12 (the first spacer), and the in-card spacer 71 are further mounted on the lower sheet member 11 (FIG. 53). The in-card spacer 71 is formed using synthetic paper or polycarbonate, polyester such as PET, vinyl chloride, or a metal such as stainless steel and iron. The thickness of the in-card spacer 71 is identical to or smaller than that of the spacer 12. If the thickness is identical to that of the spacer 12, then both surfaces of the in-card spacer 71 are bonded to the lower sheet member 11 and the upper sheet member 18 by providing both surfaces of the in-card spacer 71 with glue print. In this case, the glue print may be provided on either the in-card spacer 71 or the lower and upper sheet members 11, 18. If the thickness is thinner than that of the spacer 12, then a gap of 0.05 mm, for example, is provided between the in-card spacer and the lower sheet member 11 or the upper sheet member 18 so that the resinous sealant 17 may flow in through the gap (FIG. 51).

The same lower casting plate shown in FIG. 44 is used for the lower casting plate 10.

Thus, after the lower sheet member 11, the spacer 12, the in-card spacer 71, and the circuit elements 3 are mounted on the lower casting plate 10, the resinous sealant 17 is injected in the same manner as that illustrated in FIG. 45.

In the next step, the upper casting plate 19 is placed on the lower casting plate, with the upper sheet member 18 suctioned to the upper casting plate 19 (FIG. 54) also in this embodiment. The upper casting plate 19 is then pressed, the intermediate product 23 is taken out after the resin is cured, and the final product is punched. The same upper casting plate and the upper sheet member illustrated in FIG. 47 and FIG. 48 are employed for the upper casting plate 19 and the upper sheet member 18 in this embodiment.

Thus, according to the memory card of this embodiment, the good form retention of the in-card spacer 71 owing to the rigidity and elasticity thereof prevents the circuit elements 3 from incurring plastic deformation, which would lead to the deformation of the memory card itself, due to twisting or the like.

Furthermore, as regards the disposition of spacers, the following variations can be considered as well, besides said embodiment of the spacer 12 and the in-card spacer 71. FIG. 55 through FIG. 58 are diagrams showing those configurations.

Figure 55:
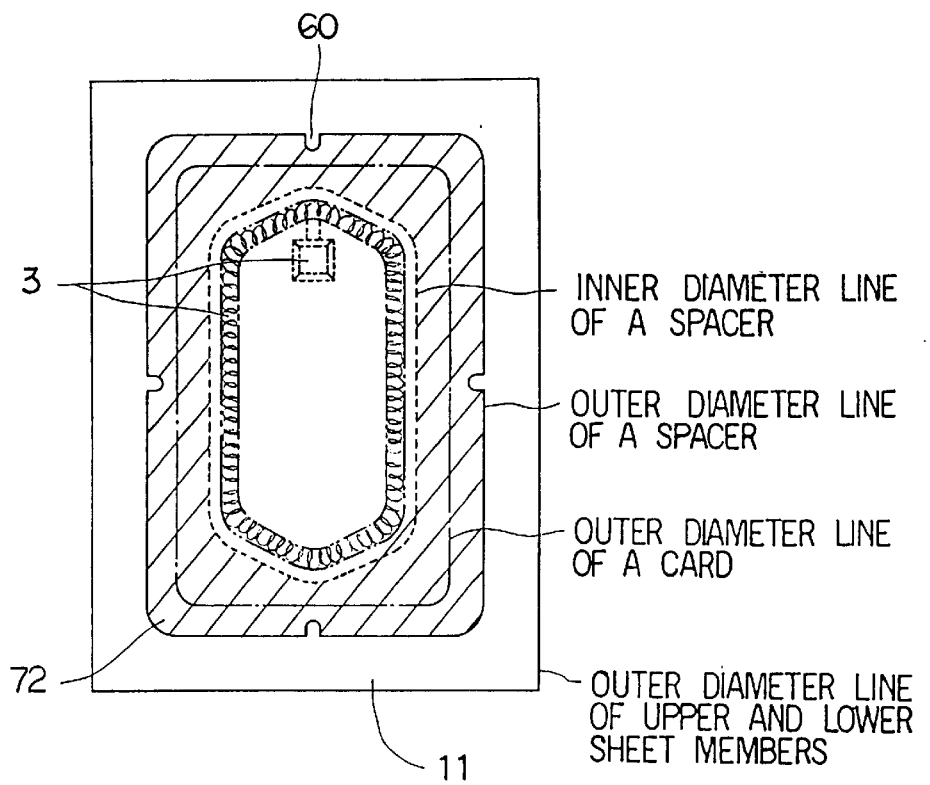
FIG. 55 is a diagram showing a variation of the disposition of a spacer.
Figure 56:
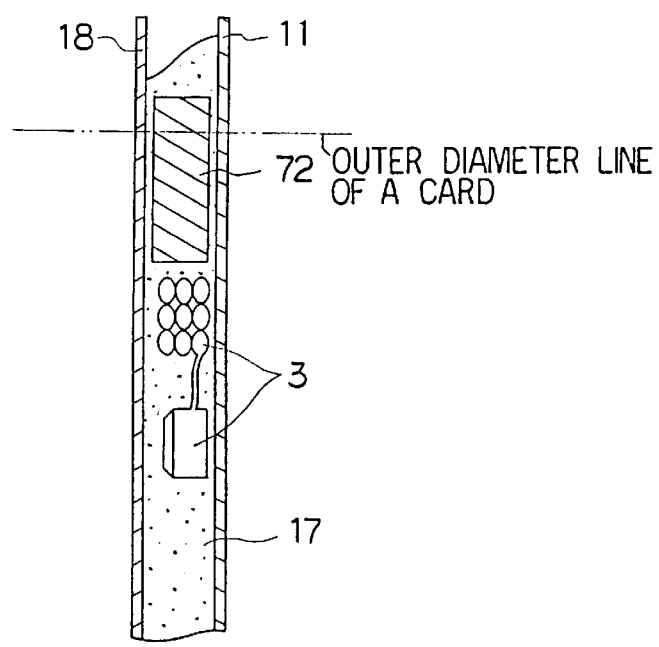
FIG. 56 is a magnified partial cross-sectional view of FIG. 55.

Here, in FIG. 55 and FIG. 56, a spacer 72 is disposed extending inside and outside the outward dimension of the final product. That is to say, the spacer 72 has such a form as said spacer 12 and said in-card spacer 71 are joined together. On the other hand, in FIG. 57 and FIG. 58, a first spacer 72 is disposed extending inside and outside the outward dimension of the final product, and also a second spacer 73 is disposed in the center of the memory card. In these cases, the spacer 72 is made, say, 5 mm bigger than the outward dimension of the final product, and the excess part is cut off when the outward form of the final product is blanked. For this reason, with reference to the final product, what is like an outer frame is formed by the spacer 72 in the part from the outer circumference to a little inside it (i.e. the periphery).

Figure 57:
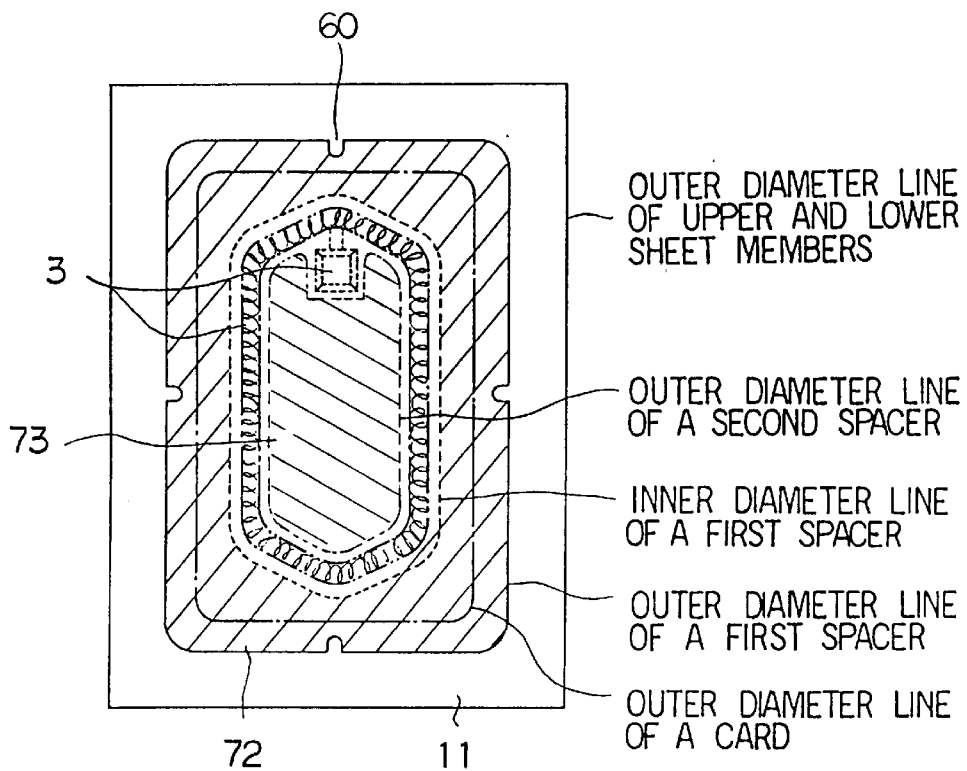
FIG. 57 is a diagram showing another variation of the disposition of a spacer and an in-card spacer.
Figure 58:
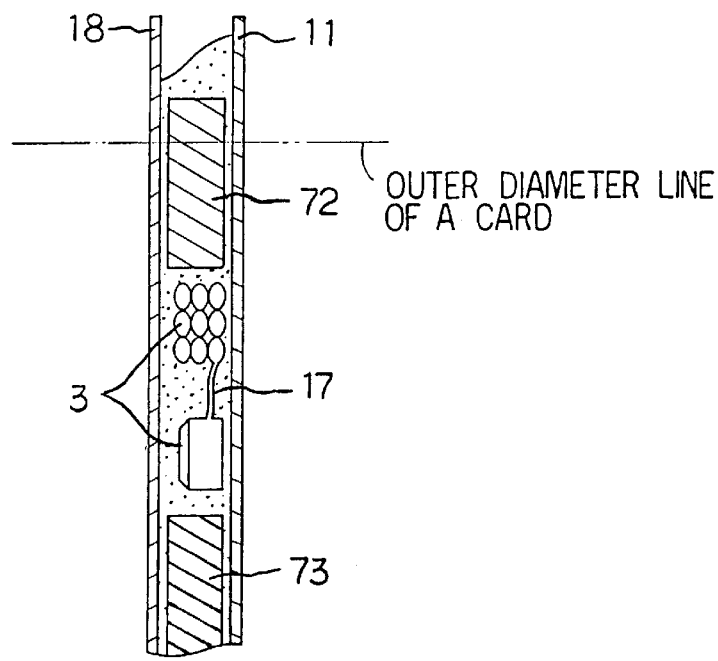
FIG. 58 is a magnified partial cross-sectional view of FIG. 57.

As a result of such a configuration, compared with FIG. 53, FIG. 55 and FIG. 56 make possible high rigidity of the memory card up to the outer circumference, and also are effective in saving the material cost of spacers and in the possibility of smaller size. Further, FIG. 57 and FIG. 58 are effective in saving the resinous sealant, and also in making possible higher rigidity and elasticity of the whole memory card, thus the flatness of surfaces of the card being improved.

Now, as manufacturing methods for a memory card according to the configurations like these, the following variations can be considered too. One is a method where the circuit elements 3 and the spacers 72, 73 are mounted on the lower sheet member 11 after they are soaked in the resinous sealant in advance (i.e. ripping treatment); and another is one where the circuit elements 3 and others are preliminarily installed by the glue-printed sections 50 which are placed in dots, as shown in FIG. 59 through FIG. 62.

Hereupon, in the aforesaid method where the circuit elements 3 and others are embedded into the resinous sealant 17, or the resinous sealant 17 is injected after the circuit elements 3 are mounted on the lower sheet member 11, there is also a problem that the air is not sufficiently let out because the air in the coil of the circuit elements 3, especially of the transmitting/receiving device 32, is pushed into the coil. To make the matters worse, when strong suction is done in order to let the air out, the resinous sealant 17, too, is sucked together, thus resulting in the situation that dimensional precision is lost.

Therefore, in the present variation, the circuit elements 3 and the spacers 72, 73 are soaked in the resinous sealant in advance, on purpose to let out beforehand the air in them and the bubbles which are apt to remain on their surfaces. By this treatment, the left air in the memory card becomes small itself, and also the remaining air rises toward surfaces before it is pushed into the inside of the circuit elements 3 and the like, which present an effect that the air in the memory card can be sufficiently let out.

Then it goes without saying that this ripping treatment may be done to only either the circuit elements 3 or the spacers 72, 73.

On the other hand, in the aforesaid manufacturing method for a memory card where glue-printed sections 50 are used, said glue-printed sections 50 are provided in belts. Therefore, when the memory card in bent along the coil of the circuit elements 3, there also arose the situation that the coil adhering to the glue-printed sections 50 comes off them and loosens accompanying the plastic deformation of the coil. In such a case, not only the coil and the card itself incur deformation, but also the transmitting/receiving function of the coil is spoiled on occasions.

Figure 59:
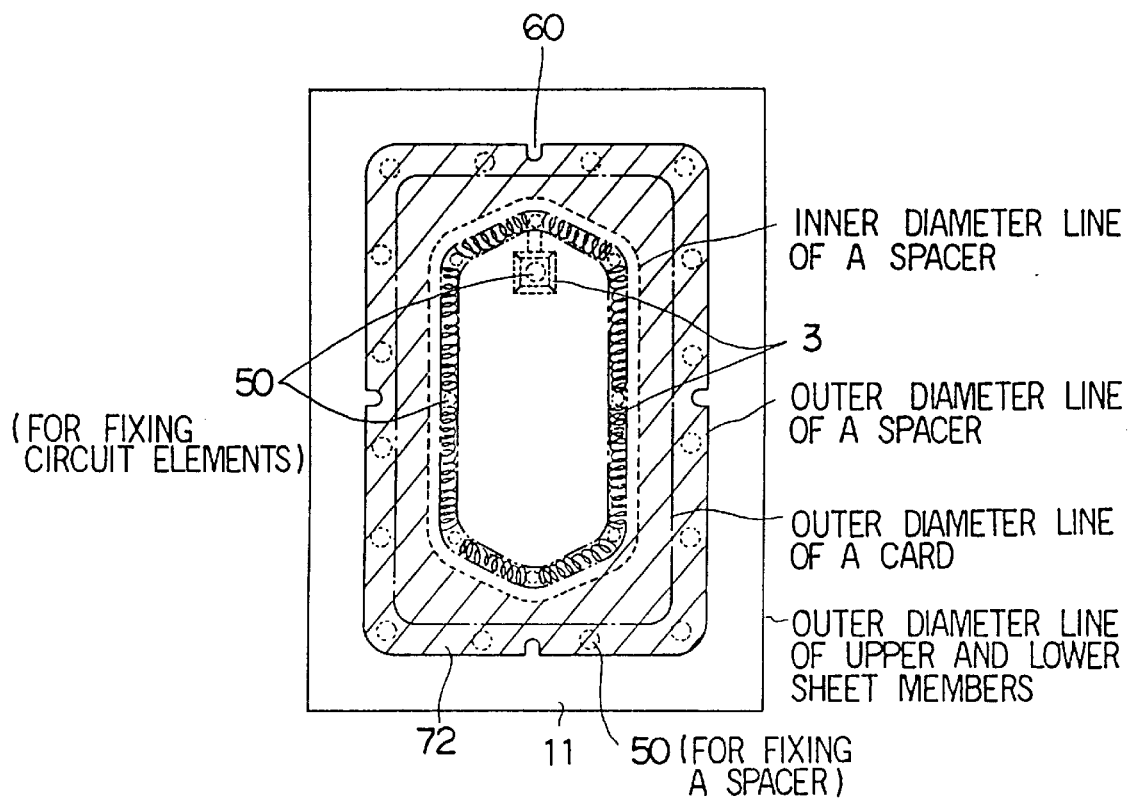
FIG. 59 is a diagram showing a variation of the disposition of a spacer in FIG. 55, where the glue print is provided to a sheet member in dots.
Figure 60:
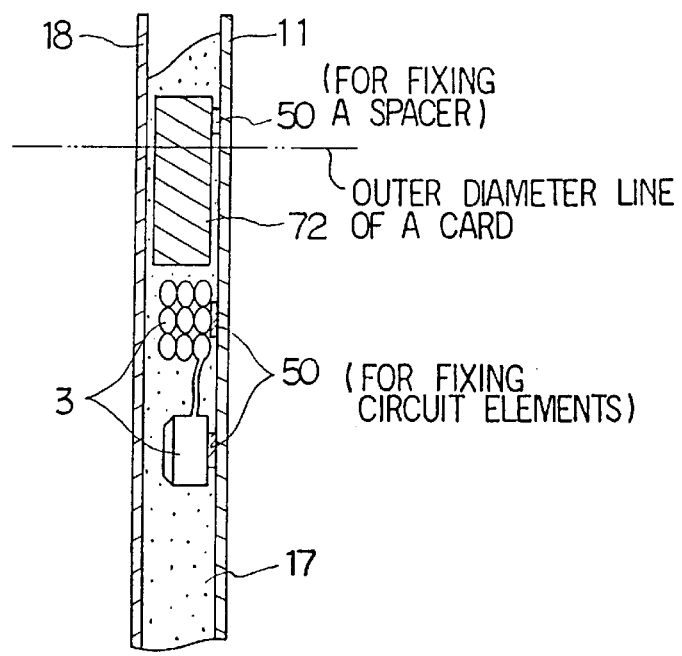
FIG. 60 is a magnified partial cross-sectional view of FIG. 59.
Figure 61:
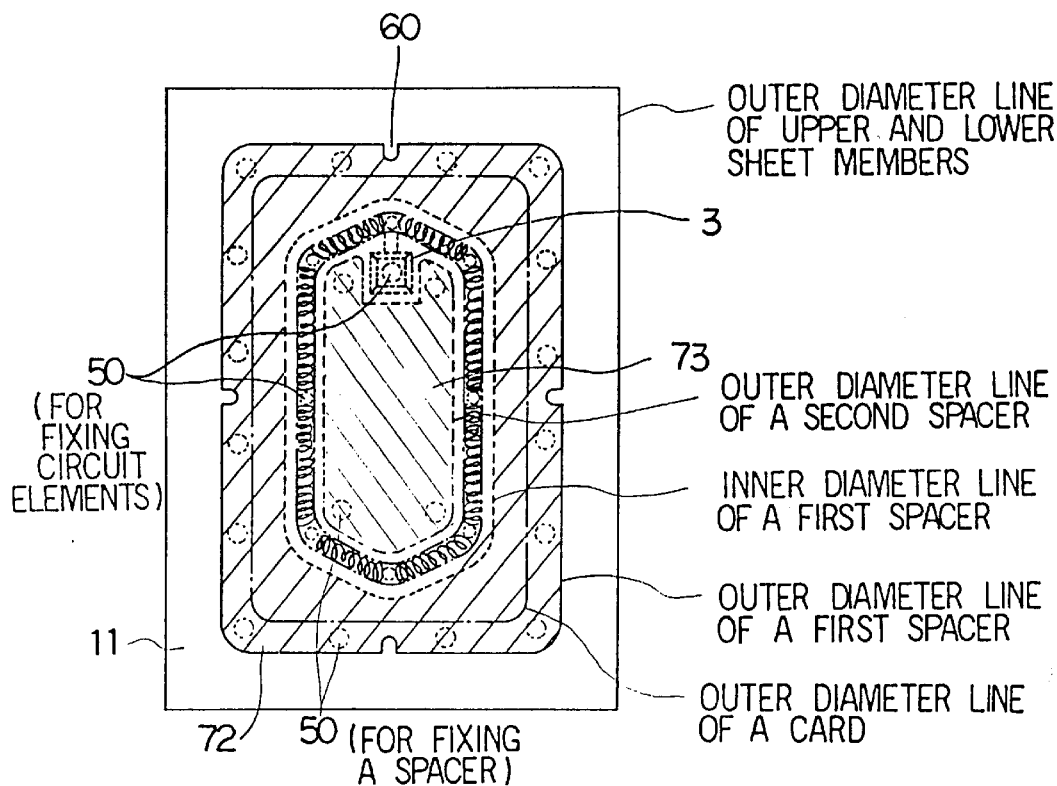
FIG. 61 is a diagram showing a variation of the disposition of a spacer and an in-card spacer in FIG. 57, where the glue print is provided to a sheet member in dots.
Figure 62:
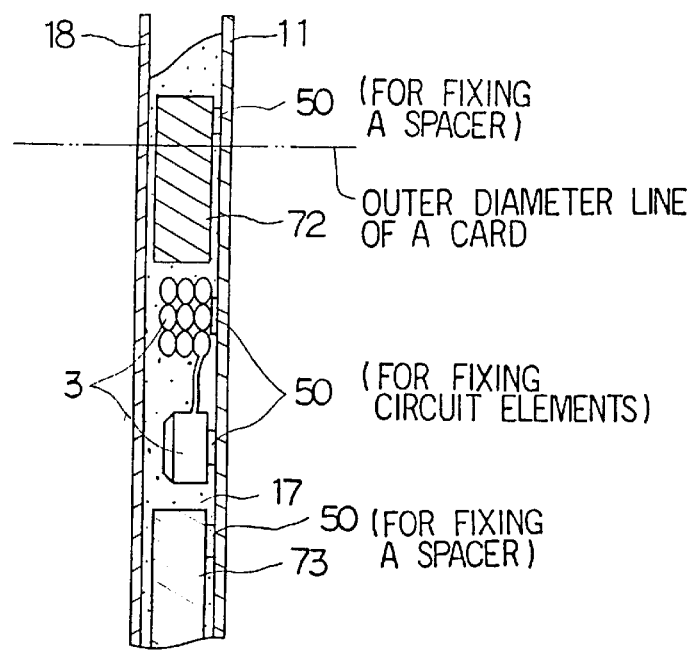
FIG. 62 is a magnified partial cross-sectional view of FIG. 61.
Figure 63:
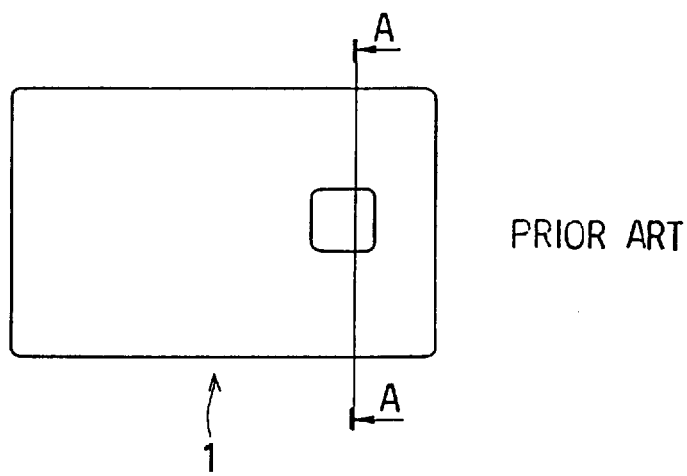
FIG. 63 is a diagram showing the structure of a conventional memory card.
Figure 64:
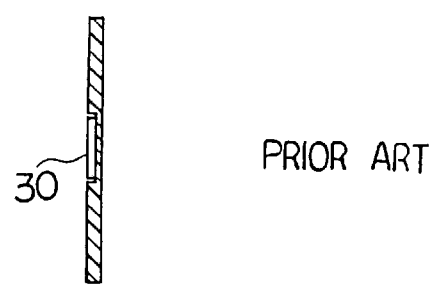
FIG. 64 is a cross-sectional view taken along line A—A of FIG. 63.

Therefore as shown in FIG. 59 through FIG, 62, in the present variation, the glue-printed sections 50 are placed in dots, by which the quantity thereof is minimized to one necessary for preliminarily installing the circuit elements 3, and also between the dotted glue-printed sections 50 the resinous sealant settles said circuit elements 3. Since by this procedure the resin spreading between the dotted glue-printed sections 50 envelops said circuit elements 3, it becomes possible to prevent said circuit elements 3 from deformation and from loosening caused by bending of the card. Further, even if said circuit elements 3 come off said glue-printed section 50, the coming off is so slight as to produce no effect.

Both surfaces of the final product produced by said manufacturing method are ground to be flat. With regard to the ways of grinding, for example, high-precision grinding of several microns can be done in order to exfoliate surfaces by putting the product in a super-precision diamond grinder simultaneously with a water shower. As a result of this surface grinding, surfaces of the final product become smooth and polished, thus enabling the clear printing of characters, photographs, etc. on surfaces of the product.

I claim:

1. A memory card having a spacer and circuit elements including a semiconductor device and a transmitting/receiving device sealed within a synthetic resin substrate in the form of a substantially flat plate;

a pair of substantially parallel synthetic resin sheet members spaced from each other a distance substantially corresponding to the thickness of said synthetic resin substrate plate; and at least one glue-printed section provided between said spacer and each circuit element and at least one of said synthetic resin sheet members for fixing said spacer and circuit elements to said at least one synthetic resin sheet member, said glue-printed sections fixing said spacer and circuit elements and being substantially surrounded by said synthetic resin substrate.

2. A memory card according to claim 1, wherein epoxy resins or UV hardened resins are used as said synthetic resin for sealing said circuit elements in said substrate, said synthetic resin sheet members being formed of a material selected from the group of polyester films, vinyl chloride sheets or polycarbonate films for covering both surfaces of said substrate.

3. A memory card according to claim 1, wherein the thickness of said synthetic resin sheet member is about 0.1 mm, and the whole thickness after both surfaces of said substrate have been covered with said synthetic resin sheet members is about 0.76 mm.

4. A memory card according to each of claims 1 through 3, wherein a spacer is disposed in said substrate and said spacer is sealed inside said substrate together with said circuit elements.

5. A memory card according to claim 4, wherein said spacer is disposed in the periphery of said substrate.

6. A memory card according to claim 4, wherein said spacer is disposed in the center of said substrate.

7. A memory card according to claim 4, wherein said spacer is disposed both in the periphery of and the center of said substrate.

8. A memory card according to claim 4, wherein glue-printed sections are provided between said spacer and said synthetic resin sheet members for fixing said spacer to said synthetic resin sheet member, by which the quantity of said glue-printed sections is minimized to one necessary for fixing said spacer.

9. A memory card according to claim 4, wherein said glue-printed sections are placed in dots.

10. A manufacturing method for a memory card having a spacer and circuit elements including a semiconductor device and a transmitting/receiving device sealed within a synthetic resin substrate in the form of a substantially flat plate, comprising the steps of:

a. laying a first synthetic resin sheet member on a flat lower casting plate;

b. providing at least one glue-printed section between said first synthetic resin sheet member and each of said circuit elements and said spacer for fixing each of said circuit elements and said spacer to said fixing synthetic resin sheet member;

c. mounting said circuit elements on said first synthetic resin sheet member by means of said glue-printed sections;

d. injecting a synthetic resin onto said first sheet member which is placed on the lower casting plate to substantially surround said circuit elements and form said synthetic resin substrate;

e. placing a flat upper casting plate with a second synthetic resin sheet member on a surface on a side of said lower casting plate to position said first and second synthetic resin sheet members on opposite sides of said synthetic resin substrate and said spacer and pressing said synthetic resin substrate between said upper and lower casting plates;

f. curing said synthetic resin substrate while maintaining said pressing pressure;

g. removing a resin body, which has been cured, from between said casting plates; and h. blanking said resin body to a predetermined dimension to form it into a completed memory card.

11. A manufacturing card according to claim 10, wherein both surfaces of said final product are ground to be flat.

* * * * *